(12) United States Patent
Usuda et al.

(10) Patent No.: US 7,178,998 B2
(45) Date of Patent: Feb. 20, 2007

(54) FOCAL PLANE SHUTTER FOR DIGITAL STILL CAMERAS

(75) Inventors: Yuichirou Usuda, Saitama (JP); Shigemi Takahashi, Tokyo-to (JP)

(73) Assignee: Nidec Copal Corporation, Tokyo (JP)

( * ) Notice: Subject to any disclaimer, the term of this patent is extended or adjusted under 35 U.S.C. 154(b) by 68 days.

(21) Appl. No.: 10/945,114

(22) Filed: Sep. 21, 2004

(65) Prior Publication Data
US 2005/0063698 A1    Mar. 24, 2005

(30) Foreign Application Priority Data
Sep. 24, 2003  (JP)  .............................. 2003-331817
Aug. 2, 2004   (JP)  .............................. 2004-225768

(51) Int. Cl.
*G03B 9/40* (2006.01)
(52) U.S. Cl. .................. 396/484; 396/486; 396/489
(58) Field of Classification Search ........ 396/484–489, 396/463–464, 453, 456, 493
See application file for complete search history.

(56) References Cited

U.S. PATENT DOCUMENTS

| | | | | |
|---|---|---|---|---|
| 4,290,682 A | * | 9/1981 | Saito et al. ................ | 396/469 |
| 4,407,574 A | * | 10/1983 | Tomino et al. ............. | 396/273 |
| 4,657,366 A | * | 4/1987 | Tanabe et al. ............. | 396/456 |
| 6,089,760 A | * | 7/2000 | Terada ...................... | 396/463 |
| 6,536,962 B2 | * | 3/2003 | Takahashi .................. | 396/466 |
| 6,547,457 B2 | | 4/2003 | Yaginuma et al. ......... | 396/460 |
| 6,726,379 B2 | | 4/2004 | Watabe et al. ............. | 396/456 |
| 2002/0006285 A1 | * | 1/2002 | Takahashi .................. | 396/484 |

FOREIGN PATENT DOCUMENTS

| | | |
|---|---|---|
| JP | 06-308570 | 11/1994 |
| JP | 10-003108 | 1/1998 |
| JP | 11-122542 | 4/1999 |
| JP | 2002-287210 | 10/2002 |
| JP | 2003-107559 | 4/2003 |

* cited by examiner

Primary Examiner—W. B. Perkey
Assistant Examiner—Rishi Suthar
(74) Attorney, Agent, or Firm—Smith Gambrell & Russell

(57) ABSTRACT

A drive member attached to the output shaft of a DC motor placed on a shutter base board includes a drive pin connected to the arm of a shutter blade within a blade chamber for driving the shutter blade to open and close an exposure opening with the reciprocal rotation of the DC motor. A brake member rotatably attached to the shutter base board and having a frictional force applied thereto by a spring washer brakes the rotation of the drive member when a bent portion is pushed by the drive pin to rotate.

15 Claims, 25 Drawing Sheets

FOCAL PLANE SHUTTER FOR DIGITAL STILL CAMERAS

BACKGROUND OF THE INVENTION

1. Field of the Invention

The present invention relates to a focal plane shutter for digital still cameras having one shutter blade.

2. Description of the Related Art

Among focal plane shutters for digital still cameras, there is a shutter including only one shutter blade composed of a plurality of arms, each with one end pivoted on a base board, and at least one blade pivoted on these arms. The shutter blade opens/closes an opening of an imaging optical path by the reciprocating rotation of a drive member which is connected to one of the arms via a drive pin. It has been known that the drive member uses a set member linked to a motor for rotation in one direction while using an urging force of a spring in the other direction. The reciprocating rotation only by a motor has become of interest lately. Then, as a device advanced further than this, a drive device in that a drive member is integrated with a motor rotor is disclosed in Japanese Unexamined Patent Application Publication No. 2002-287210.

The drive device disclosed in this Publication is suitable for miniaturization, and is very effective for space-saving of the inside of a camera. However, in view of manufacturing, it is not necessarily favorable. The drive member usually operates at a considerable high speed, and upon stopping, it abuts a stopper so as to receive a large impact therefrom. Hence, the rotor requires large motive power and must withstand such large impact. In the drive device disclosed in Japanese Unexamined Patent Application Publication No. 2002-287210, since motor components are assembled on the shutter base board one by one, its performance inspection must be carried out after the shutter assembling. If a drive device fails in the inspection, the motor components must be disassembled and then reassembled, resulting in very troublesome operation and high cost.

If only this problem is taken into consideration, it becomes rather advantageous to use a general-purpose motor so as to drive an independent drive member as usual. However, when such a general-purpose motor is used, since a transmission mechanism to the drive member is complicated, the entire drive device becomes large in size, and although the motor itself is inexpensive, the entire cost is pushed up.

SUMMARY OF THE INVENTION

The present invention has been made in order to solve such problems, and it is an object of the present invention to provide a focal plane shutter for digital still cameras extremely advantageous for miniaturization and cost reduction due to a simplified transmission mechanism for a shutter-blade drive member, although an inexpensive general-purpose DC motor is used as a drive source for one shutter-blade opening and closing to improve the efficiency of an assembling work.

In order to achieve the above-object, a focal plane shutter for digital still cameras according to the present invention includes two base boards, each having an exposure opening, arranged to form a blade chamber between both the base boards; one shutter blade composed of a plurality of arms arranged within the blade chamber, one end of each arm being rotatably attached to any one of the base boards, and at least one blade pivoted to the arms; a DC motor being reciprocally rotatable and attached to any one of the base boards; and a drive member, having a drive pin connected to one of the arms, for driving the shutter blade to open and close the opening by being reciprocally rotated by the DC motor.

Preferably in practice, the DC motor is attached to any one of the base boards with its output shaft being in parallel with an optical axis, and the drive member is attached to the output shaft, and the shutter further includes a bearing member attached to any one of the base boards and the extreme end of the output shaft is journaled by the bearing member.

Preferably, the DC motor with its output shaft arranged in parallel to an optical axis is attached to the base board and a spur gear is attached to the output shaft while the drive member is provided with an integrally formed spur gear to be mated with the spur gear. Furthermore, at least one gear may also be interposed between the spur gear attached to the output shaft and the spur gear of the drive member. In these cases, when the drive member and the spur gear of the drive member are integrally made from a synthetic resin, the manufacturing is advantageous for cost.

According to the present invention, the DC motor may be a DC motor with a reducer. Preferably, the shutter according to present invention further includes detecting means for detecting whether the shutter blade reaches at least one of vicinities of positions where the shutter blade fully opens the opening and it fully closes the opening, and an electric current for driving the DC motor is cut or limited with the detected signal of the detecting means. In this case, the detecting means may include a first optical sensor for detecting the shutter blade in the vicinity of the position where the shutter blade fully opens the opening and a second optical sensor for detecting the shutter blade in the vicinity of the position where the shutter blade fully closes the opening, and an electric current for driving the DC motor may be cut or limited with the respective detected signals of the optical sensors. The detecting means may also include an optical sensor for detecting the shutter blade which opens the opening by about half, and an electric current for driving the DC motor may also be cut or limited after a lapse of predetermined time by actuating a delay circuit with the detected signal of the optical sensor.

In a focal plane shutter for digital still cameras having one shutter blade according to the present invention, a general-purpose inexpensive DC motor completed as a motor unit in advance is used for a drive source for driving the shutter blade. Moreover, a transmission structure to the drive member of the shutter blade is simplified so that the shutter assemble process is efficient and the shutter can be significantly reduced in size and cost.

This and other objects as well as the features and the advantages of the present invention will become apparent from the following detailed description of the preferred embodiments when taken in conjunction with the accompanying drawings.

DESCRIPTION OF THE PREFERRED EMBODIMENTS

First to sixth embodiments according to the present invention will be described with reference to the drawings. In any of the embodiments, a general-purpose DC motor without a reduction gear built therein is used for a drive source of a shutter blade. In focal plane shutters for digital still cameras with the same structure, any one of two operating systems, normally open and normally closed, is adopted. These embodiments will be described on the assumption that the normally open type is adopted.

Figure 1:
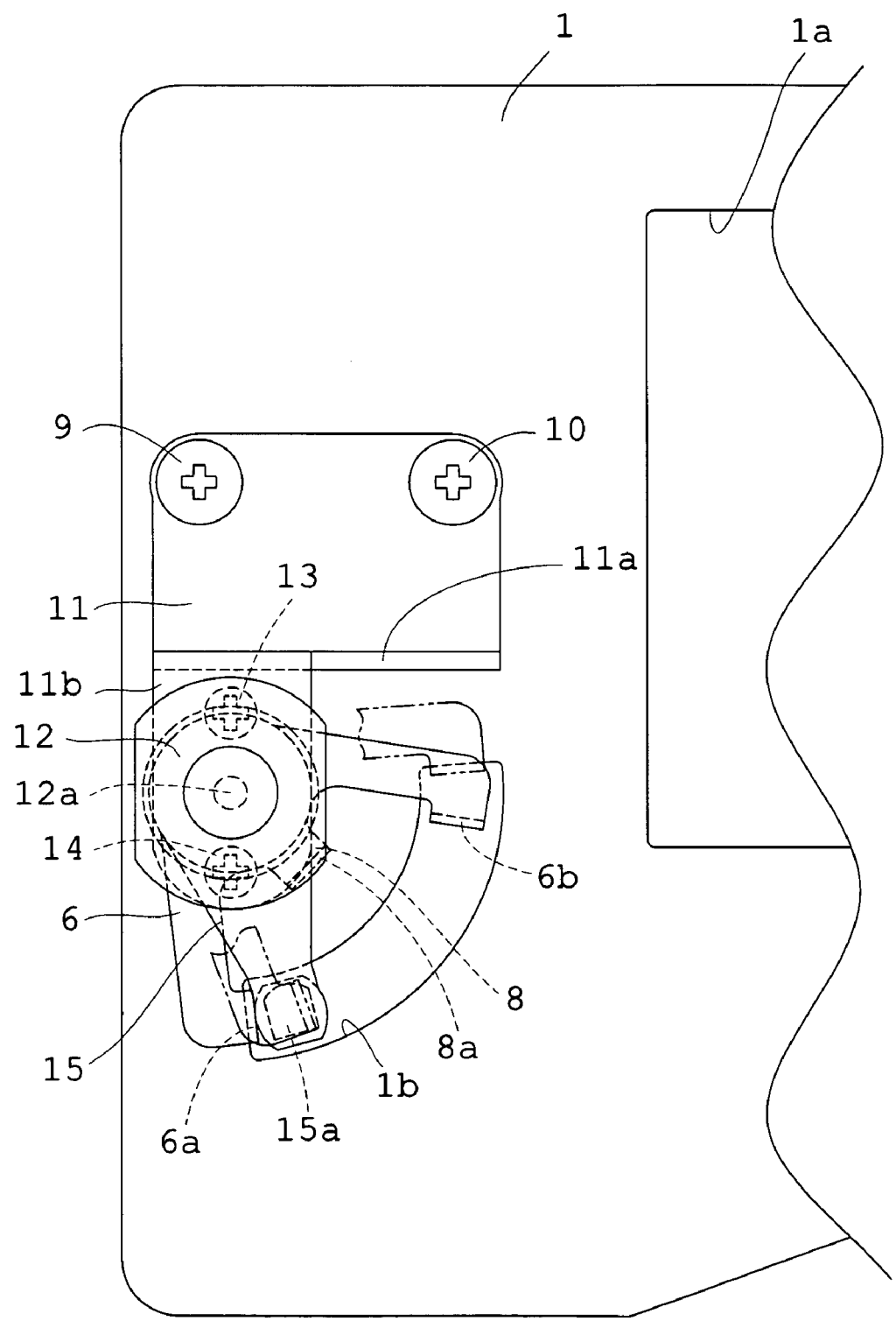
FIG. 1 is a plan view for illustrating a drive device according to a first embodiment of the present invention.
Figure 2:
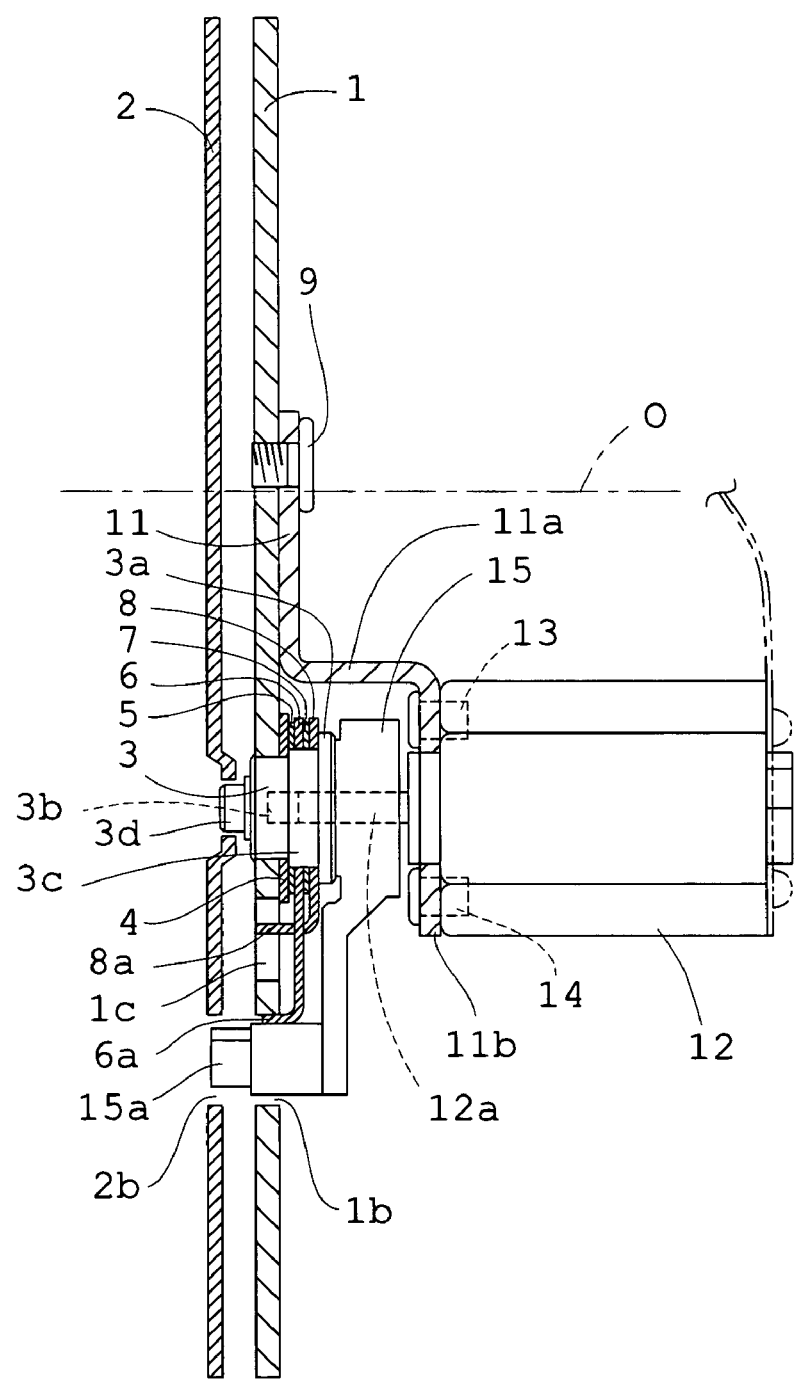
FIG. 2 is a longitudinal sectional view of FIG. 1.
Figure 5:
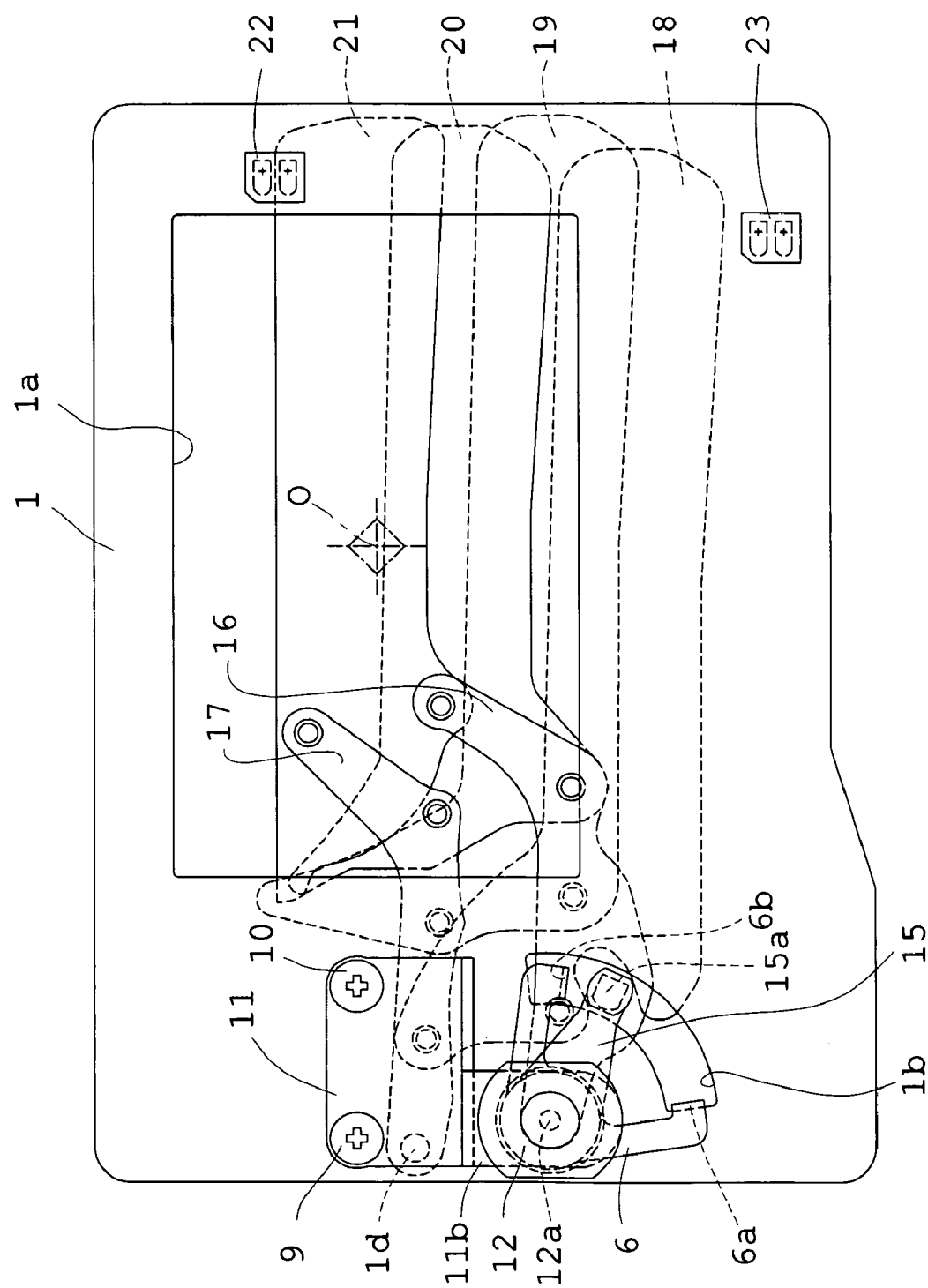
FIG. 5 is a plan view showing that the shutter blade reaches the state immediately before the exposure opening finishes to be closed from the state of FIG. 4.
Figure 6:
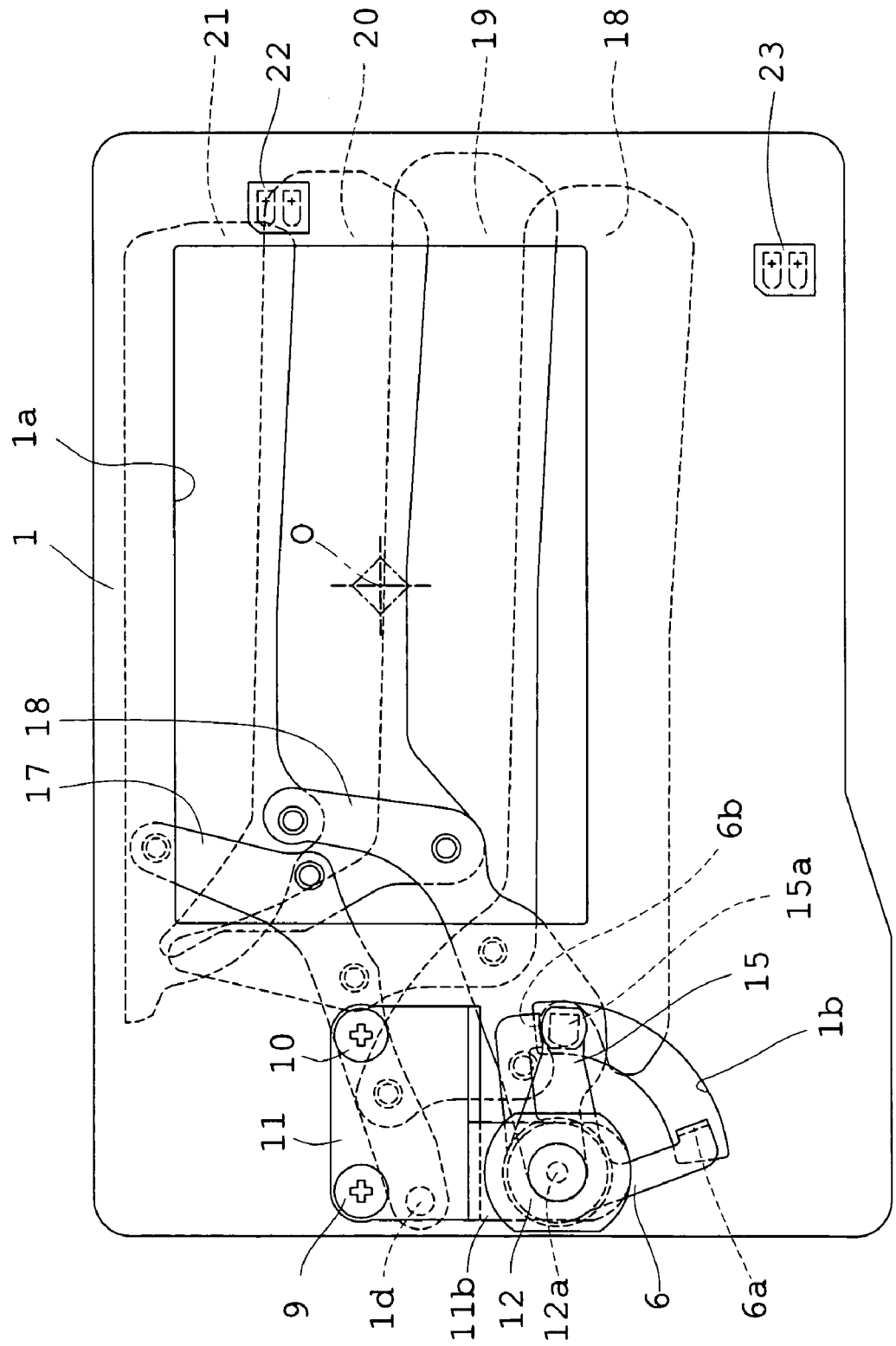
FIG. 6 is a plan view showing a state in that the shutter blade closes the exposure opening from the state of FIG. 5 and stops immediately thereafter.
Figure 7:
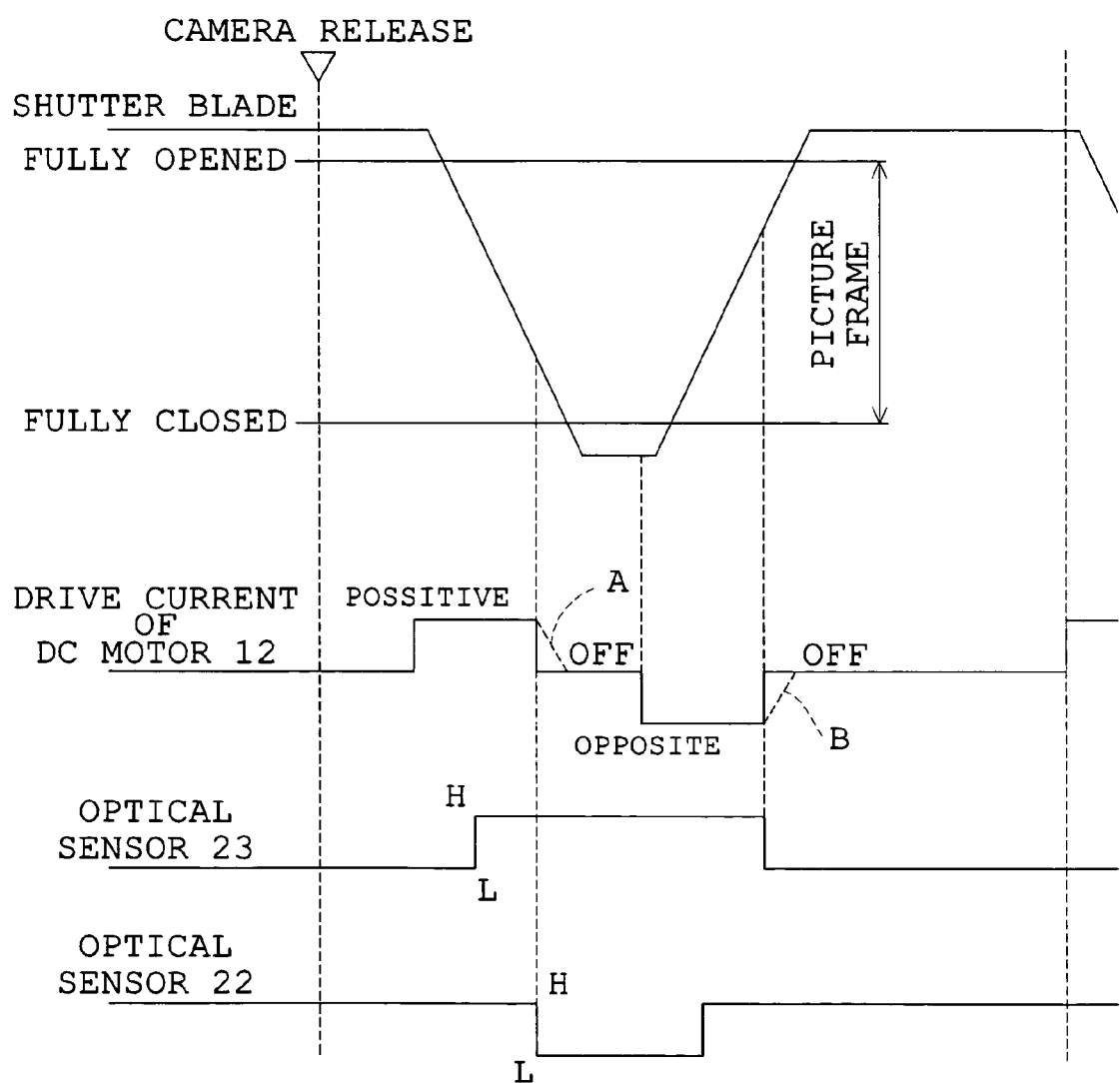
FIG. 7 is a timing chart for illustrating the operation according to the first embodiment.
Figure 8:
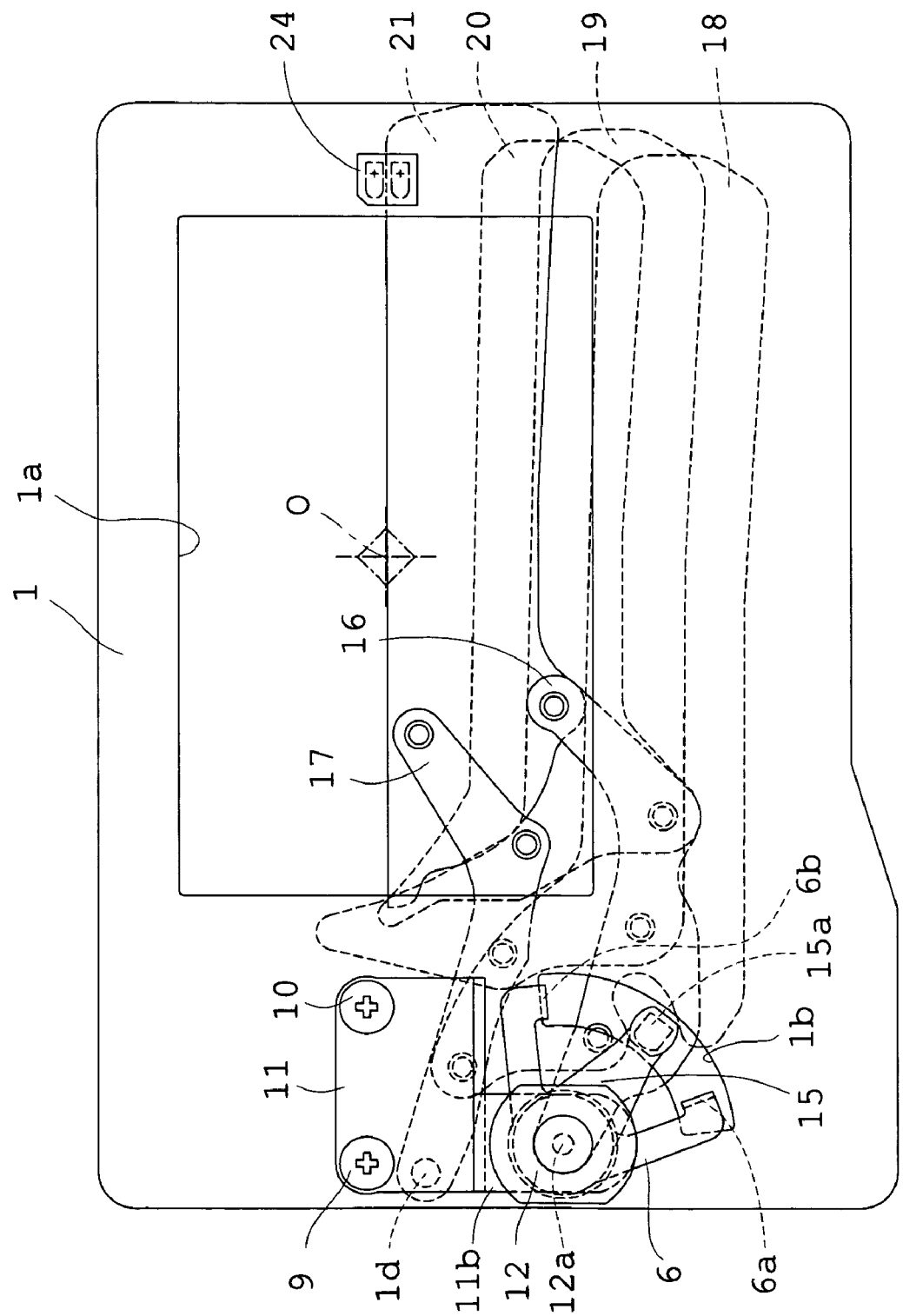
FIG. 8 is a plan view of a second embodiment according to the present invention showing a state in that the shutter blade starts closing the exposure opening from the initial state so as to close the opening by about half.
Figure 9:
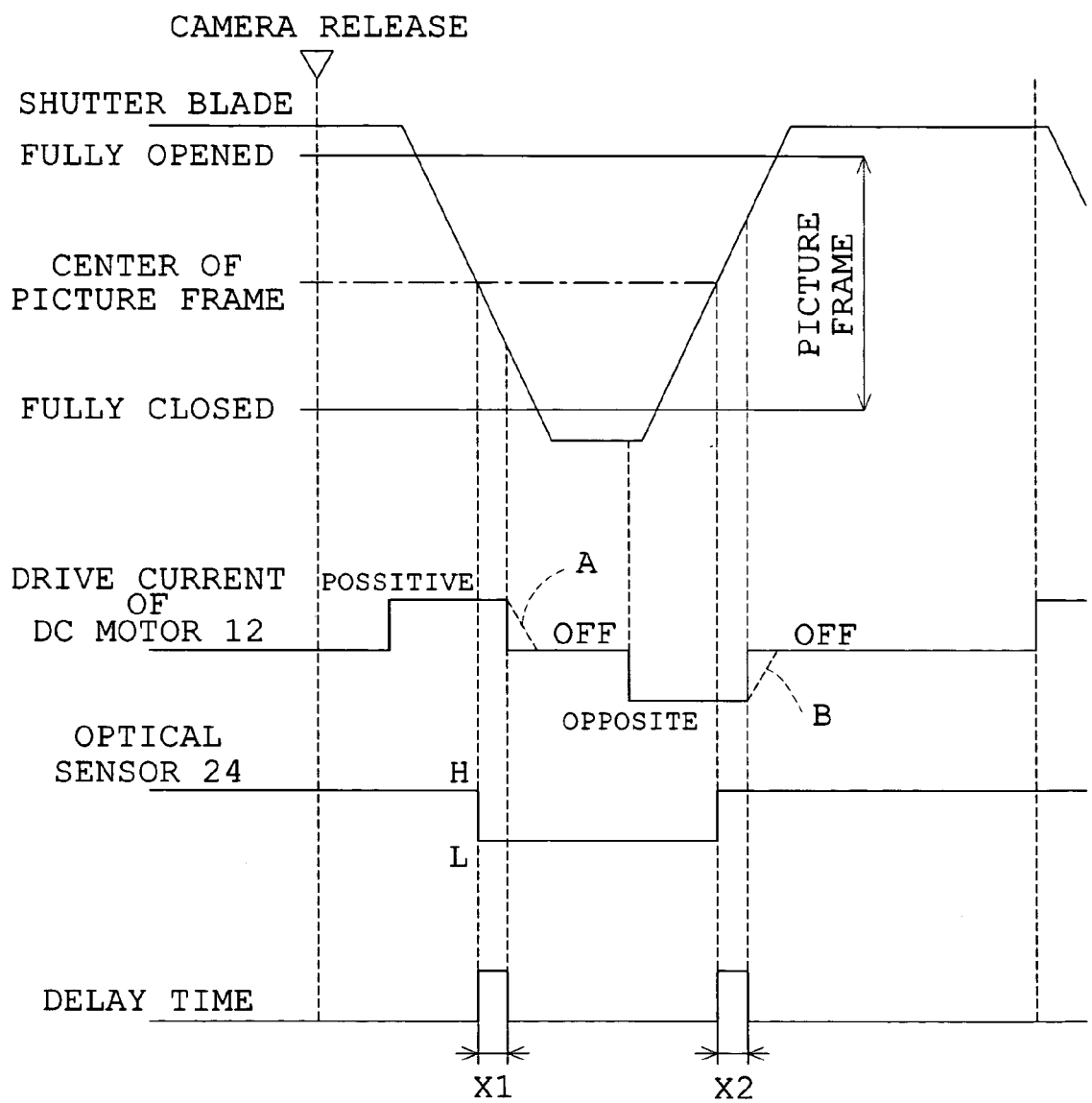
FIG. 9 is a timing chart for illustrating the operation according to the second embodiment.
Figure 14:
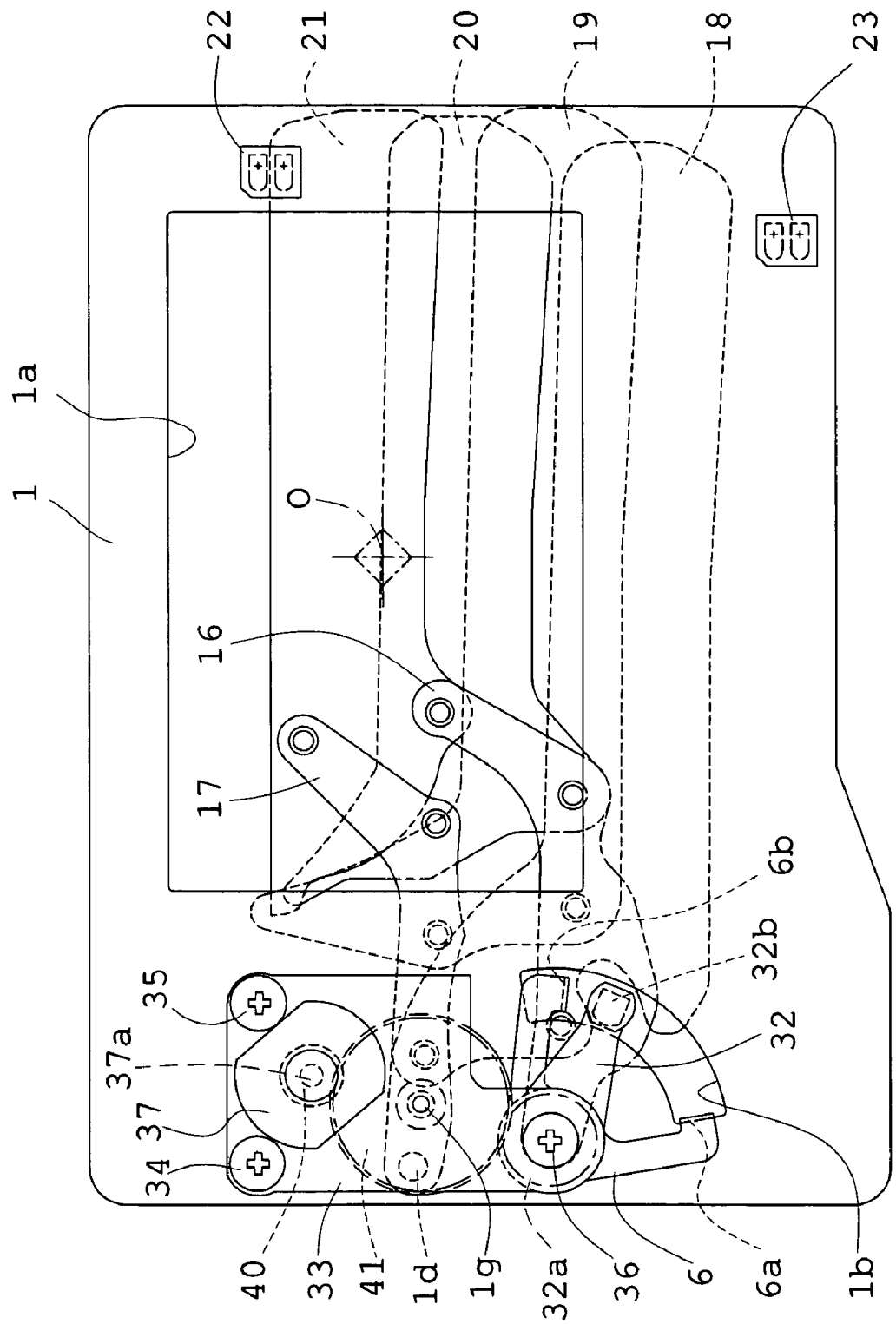
FIG. 14 is a plan view showing that the shutter blade reaches the state immediately before the exposure opening finishes to be closed from the state of FIG. 13.
Figure 15:
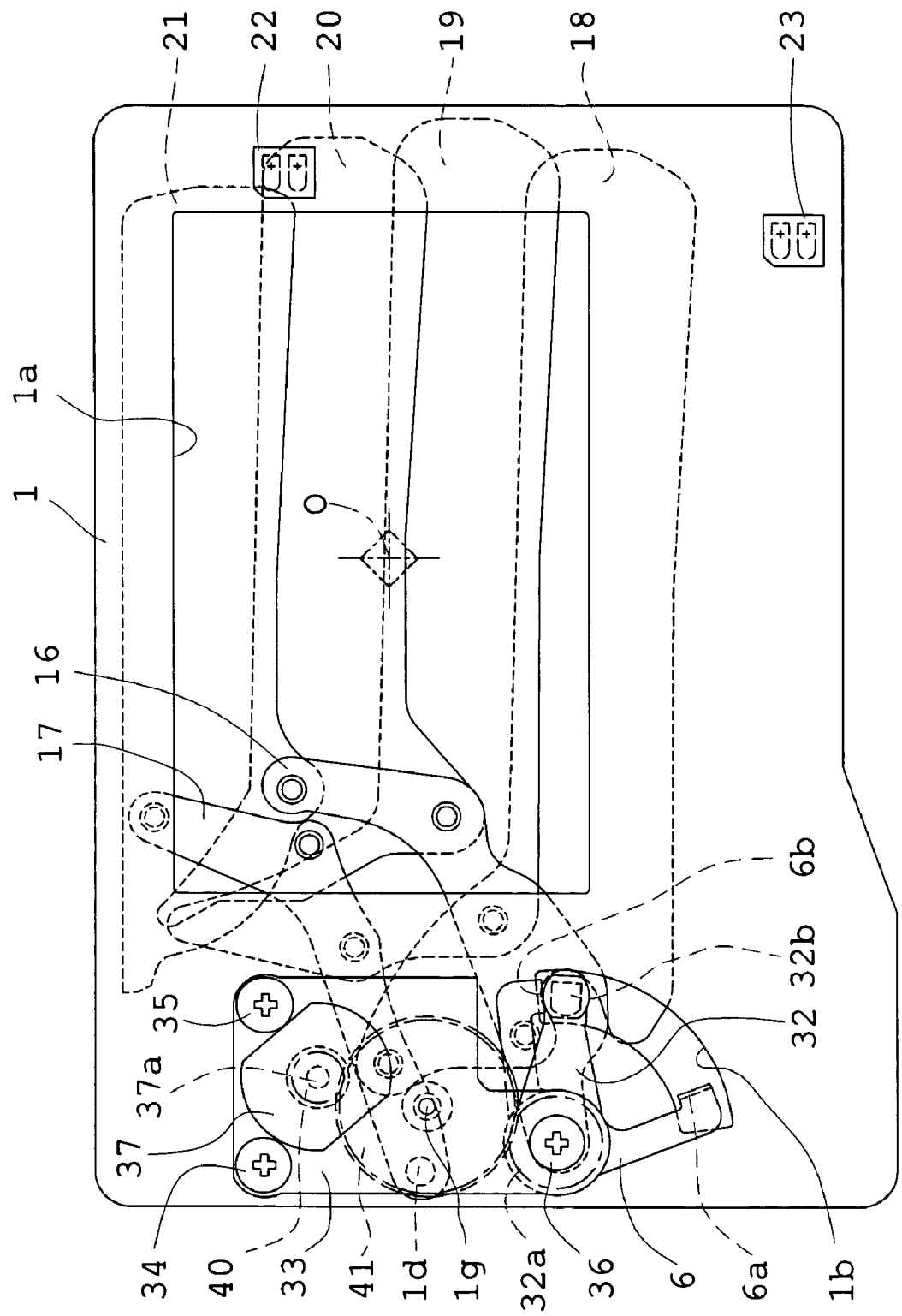
FIG. 15 is a plan view showing a state in that the shutter blade closes the exposure opening from the state of FIG. 14 and stops immediately thereafter.
Figure 16:
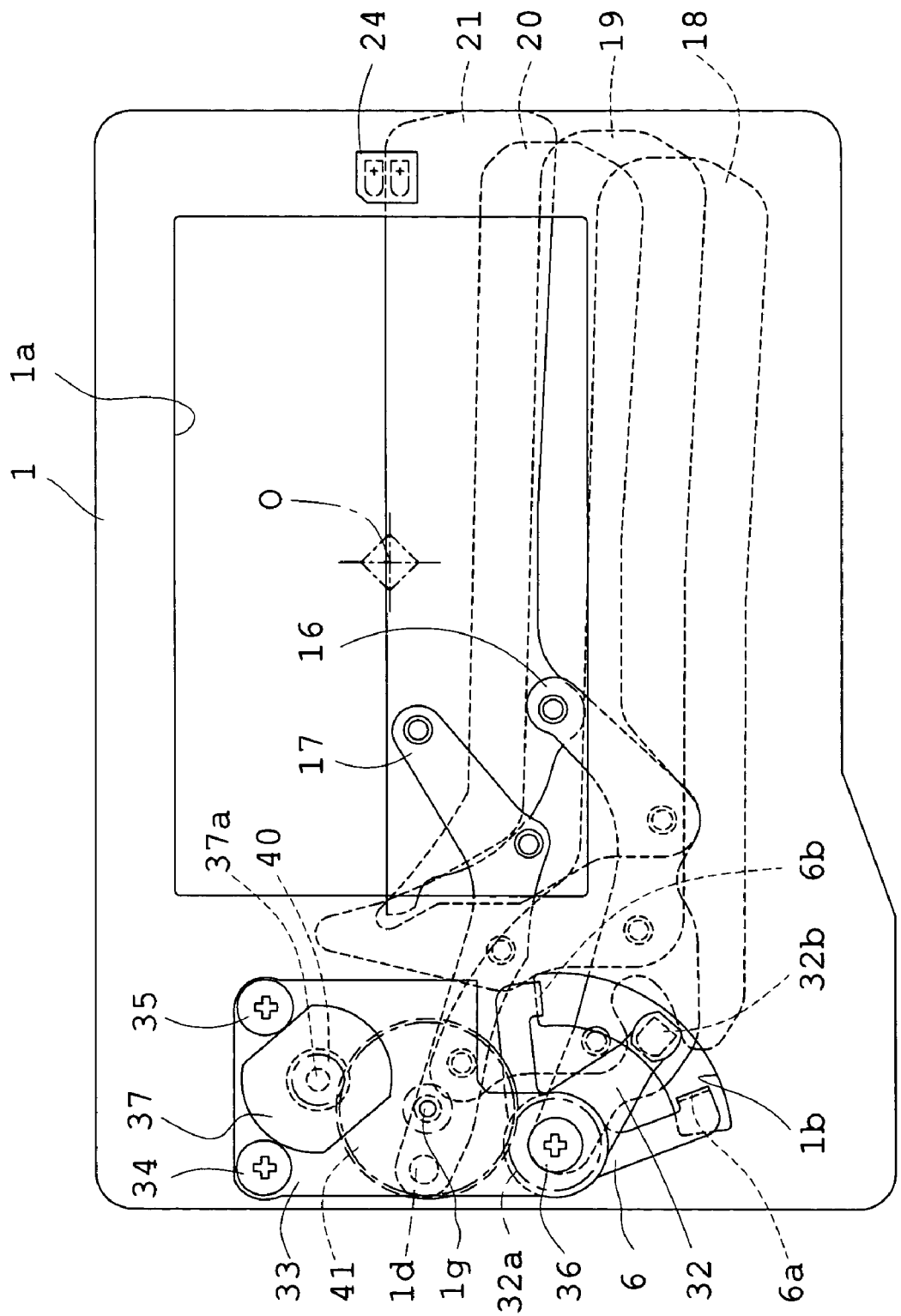
FIG. 16 is a plan view of a fourth embodiment according to the present invention showing a state in that the shutter blade starts closing the exposure opening from the initial state so as to close the opening by about half.

FIGS. 1 to 7 are for illustrating the first embodiment; FIGS. 8 and 9 the second embodiment; FIGS. 10 to 15 the third embodiment; FIG. 16 the forth embodiment; FIGS. 17 to 23 the fifth embodiment; and FIGS. 24 and 25 the sixth embodiment. Among these drawings, FIGS. 1 and 2 are quoted also to the second embodiment; FIG. 7 to the third embodiment; and FIGS. 9 to 11 to the fourth embodiment.

First Embodiment

Figure 3:
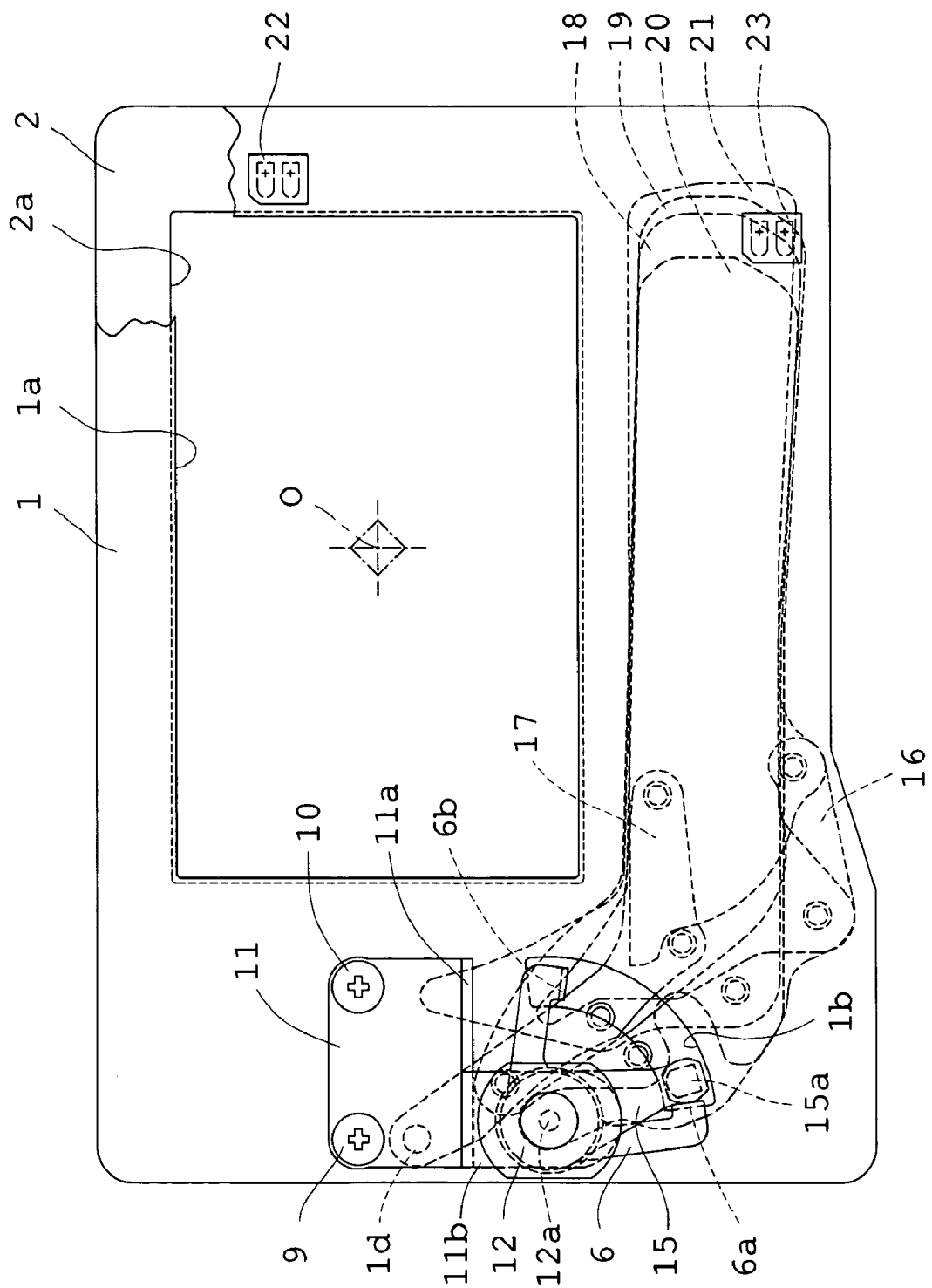
FIG. 3 is a plan view of the first embodiment showing an initial state in that a shutter blade fully opens an exposure opening.
Figure 4:
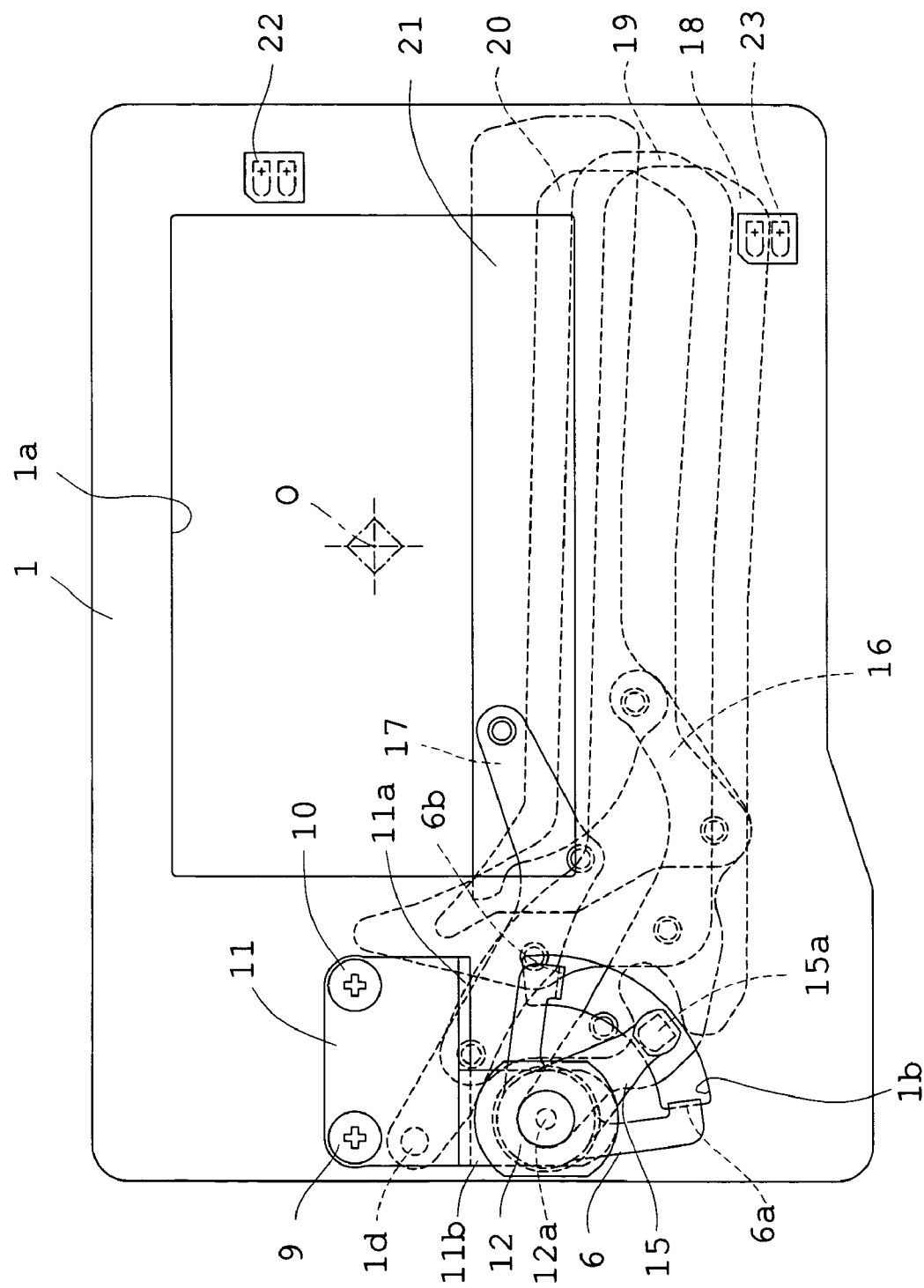
FIG. 4 is a plan view showing a state in that the shutter blade starts closing the exposure opening from the initial state of FIG. 3.

First, the first embodiment will be described with reference to FIGS. 1 to 7. FIG. 1 is a plan view for illustrating a drive device according to the first embodiment; FIG. 2 is a longitudinal sectional view of FIG. 1; and FIGS. 3 to 7 are for illustrating the operation according to the first embodiment. That is, FIG. 3 is a plan view showing an initial state of a shutter blade, in which an exposure opening is fully opened; FIG. 4 is a plan view showing a state of the shutter blade, in which the exposure opening is just started closing; FIG. 5 is a plan view showing a state of the shutter blade, in which the exposure opening is just before finished closing; FIG. 6 is a plan view showing a stopped state of the shutter blade just after finishing closing the exposure opening; and FIG. 7 is a timing chart for illustrating a series of the operations.

First, the structure of a drive device according to the embodiment will be described. A shutter base board 1 is provided with a rectangular exposure opening 1a and a circular-arc elongated-hole 1b formed therein. FIG. 1 shows part of the left side of the shutter base board 1, so that the opening 1a is also shown only partly. As shown in FIGS. 2 and 3, on the backside of the shutter base board 1, an auxiliary base board 2 with substantially the same shape as that of the shutter base board 1 is attached thereto by not shown means at a predetermined interval so as to form a blade chamber between the two boards 1 and 2. In FIGS. 1 and 2, a shutter blade to be arranged within the blade chamber is not shown. The auxiliary base board 2 is also provided with an opening 2a with a size slightly larger than that of the opening 1a formed therein, and the shape of the opening 2a is shown in FIG. 3. Accordingly, the opening 1a of the shutter base board 1 restricts the exposure opening. Furthermore, the auxiliary base board 2 is provided with an elongated hole 2b formed at a position overlapping with the elongated hole 1b of the shutter base board 1 so as to have the same shape as that of the elongated hole 1b (see FIG. 2).

As is understood from FIG. 2, on the shutter base board 1, a bearing member 3 is attached with a plain washer 4 therebetween by caulking on the blade chamber side. The bearing member 3 includes a flange 3a formed at an end protruding outside the blade chamber. The bearing member 3 is also provided with a bearing hole 3b formed at the center of the end face perpendicularly to the shutter base board 1; a first shaft 3c formed between the flange 3a and the shutter base board 1; and further a second shaft 3d formed within the blade chamber. On the first shaft 3c, a plate member 5, a brake member 6, a plate member 7, and a spring washer 8 are attached in that order from the side of the shutter base board 1.

The spring washer 8 pushes the brake member 6 toward the plain washer 5 so as to apply a frictional force to the rotation of the brake member 6. By inserting a bent portion 8a of the spring washer 8 into a hole 1c (not shown in FIG. 1) of the shutter base board 1, the spring washer 8 is prevented from rotating together with the brake member 6. The two plate members 5 and 7 made of a synthetic resin function to increase a frictional force when the brake member 6 rotates. Furthermore, the brake member 6, as shown in FIG. 1, has a V planar shape with bent portions 6a and 6b formed at ends of two arms and inserted into the elongated hole 1b formed in the shutter base board 1.

On the surface of the shutter base board 1 outside the blade chamber, an installation plate 11 is attached with two screws 9 and 10. The installation plate 11 includes an erected portion 11a bent perpendicularly to the shutter base board 1 and an installation portion 11b bent in parallel to the shutter base board 1. In the installation portion 11b, a DC motor 12 with an output shaft 12a arranged in parallel with an optical axis O (i.e., perpendicularly to the shutter base board 1) is attached with two screws 13 and 14. The DC motor 12 is an inner rotor motor including a rotor having a coil and a stator having a permanent magnet so as to continuously rotate the rotor by switching the direction of current flowing through the coil. In order to securely maintain the installation state of the DC motor 12, the end of the output shaft 12a is rotatably fitted into the bearing hole 3b of the bearing member 3. A synthetic resin drive member 15, integrally attached to the output shaft 12a by press fitting, inserts a drive pin 15a of the drive member 15 into the blade chamber through the elongated hole 1b formed in the shutter base board 1.

Next, the structure of a shutter blade will be described with reference to FIG. 3. The shutter blade according to the embodiment is composed of two arms 16 and 17, and four blades 18, 19, 20, and 21. The arm 16 is rotatably attached to the second shaft 3d (see FIG. 2) at one end in the longitudinal direction as a pivotal point, and the drive pin 15a is fitted into the known elongated hole (not shown). The arm 17 is rotatably attached to a shaft 1d provided in the shutter base board 1 on the blade chamber side. As is well-known, the four blades 18, 19, 20, and 21 are pivoted to the other ends of both the arms 16 and 17 with two respective connection shafts therebetween.

Then, a positional detector of the shutter blade will be described. On the surface of the shutter base board 1 outside the blade chamber, two optical sensors 22 and 23 are attached. These optical sensors 22 and 23 are known photo-reflectors, and emission and receiving parts of each sensor face the blade chamber from a hole (not shown) formed in the shutter base board 1. The regions opposing the optical sensors 22 and 23 on the surface of the auxiliary base board 2 on the blade chamber side are reflection surfaces, and light emitted from the emission part is incident to the receiving part after reflection on the reflection surface.

Next, the operation according to the embodiment will be described. As is well-known, the operation of a shutter for digital still cameras is carried out according any one of two sequences. One of them is called a normally closed type in that an initial state is that the shutter blade closes an exposure opening, and upon a release button is pushed for imaging, the shutter blade is directly started from the initial state. The other is called a normally open type in that an initial state is that the shutter blade fully opens the exposure opening, and even upon the release button is pushed for imaging, the shutter blade is not operated at once, and at the final step of the imaging, the shutter blade is started from the initial state. The shutter according to the embodiment can be operated according to any one of the sequences. The case of the operation according to the normally open sequence will be described below with reference to FIGS. 3 to 7.

FIG. 3 shows the initial state (imaging stand-by state) of the shutter blade fully opening an exposure opening 1a. At this time, the drive member 15 is located at a rotation limited position in the clockwise direction, and the drive pin 15a brings the bent portion 6a of the brake member 6 into contact with the lower end of the elongated hole 1b. At this time, in the optical sensor 23, light emitted from the emission part does not enter the receiving part by the existence of the blade 21 for the most part, so that a detected signal becomes an L-level as shown in FIG. 7 while in the optical sensor 22, light emitted from the emission part enters the receiving part, so that a detected signal becomes an H-level. In this initial state, a photographer can observe object images with a liquid crystal display.

Upon imaging, when the release button is pushed, an electric charge stored in a solid imaging element is discharged and an electric charge for imaging starts being stored. After a lapse of predetermined time, by a signal from an exposure-time control circuit, a drive current is supplied to the DC motor 12. Thereby, the rotor of the DC motor 12 rotates in a positive direction (counterclockwise in FIG. 3) so as to counterclockwise rotate the drive member 15 attached to the output shaft 12a, so that the four blades 18 to 21 start moving upward while reducing an overlap of adjacent blades. At this time, the brake member 6 maintains the state shown in FIG. 3 by a frictional force applied by the spring washer 8 even after the drive member 15 started operating. A detected signal of the optical sensor 23 maintains the L-level until the four blades 18 to 21 become the state shown in FIG. 4; however, when the blade 18 is further elevated from the state shown in FIG. 4, light emitted from the emission part is reflected on the auxiliary base board 2 so as to reach the receiving part so that the detected signal is switched to the H-level.

Thereafter, when the four blades 18 to 21 are further elevated so as to become the state shown in FIG. 5, the detected signal of the optical sensor 22 is switched to the L signal because the light incident to the receiving part until at that time is blocked off by the blade 21. Thus, the drive current supplied to the DC motor 12 is cut off, and then the rotor of the DC motor 12, the drive member 15, and the shutter blade operate only by inertia. Immediately thereafter, the drive pin 15a abuts the bent portion 6b of the brake member 6, which is maintained in the state shown in FIGS. 3 to 5, so as to counterclockwise rotate the brake member 6. Hence, the rotation of the drive member 15 is braked thereafter, so that immediately after the four blades 18 to 21 completely close the opening 1a, the drive member 15 is stopped by the abutment of the bent portion 6b to the upper end of the elongated hole 1b. FIG. 6 shows the stopped state. In such a closed state, imaging information is transmitted from the solid imaging element to a memory.

Incidentally, according to the embodiment, immediately before the shutter blade completely closes the opening 1a, the drive current to the DC motor 12 is cut off. Thus, the drive pin 15a pushes the brake member 6 only by the inertia thereafter, so that the drive member 15 and the shutter blade are favorably braked in operation, and when the bent portion 6b of the brake member 6 abuts the upper end of the elongated hole 1b, a bound thereby produced is suppressed, preventing a phenomenon that the shutter blade temporarily opens the upper region of the opening 1a. Hence, imaging information can be early transmitted while images without unevenness can be obtained. Moreover, since the following setting operation can be early started, the next shooting can be early carried out.

When the imaging information is transmitted to the memory in such a manner, by its completion signal, a drive current in the opposite direction is supplied to the DC motor 12 so as to rotate the output shaft 12a in the clockwise direction shown in FIG. 6. Thereby, the drive pin 15a of the drive member 15 clockwise rotates the arm 16, so that the four blades 18 to 21 start moving downward while increasing an overlap of adjacent blades. At this time, the brake member 6 maintains the state of FIG. 6 by a frictional force due to the spring washer 8 even after the operation start of the drive member 15. The optical sensor 22 feeds an L-level detected signal by the blades 20 and 21 until the four blades 18 to 21 become the state shown in FIG. 5 after continuing to move downward. When the blade 21 further descends from the state shown in FIG. 5, light emitted from the emission part is reflected on the auxiliary base board 2 so as to reach the receiving part so that the detected signals of the optical sensors 22 and 23 is switched to the H-level. Thereby, from this step, any one of detected signals of the optical sensors 22 and 23 is switched to the H-level.

Then, when the four blades 18 to 21 become the state of FIG. 4 by further descending, the detected signal of the optical sensor 23 is switched to the L-level because light incident to the receiving part up to that time is blocked off by the blade 18. Hence, the drive current supplied to the DC motor 12 is cut off, and thereafter, the rotor of the DC motor 12, the drive member 15, and the shutter blade operate only by inertia. Immediately thereafter, the drive pin 15a abuts the bent portion 6a of the brake member 6 so as to clockwise rotate the brake member 6, so that the operation is braked, and the drive member 15 is stopped by the abutment of the bent portion 6a to the lower end of the elongated hole 1b, completing the set operation. This stopped state is the initial state shown in FIG. 3. At this time, since the opening 1a is fully opened, object images can be again observed with the liquid crystal display.

According to the embodiment, upon returning to the initial state in such a manner, immediately before the shutter blade fully opens the opening 1a, the drive current to the DC motor 12 is also cut off. Hence, thereafter, the drive member 15 and the shutter blade are favorably braked in operation, and when the bent portion 6a of the brake member 6 abuts the lower end of the elongated hole 1b, a bound thereby produced is suppressed, preventing a phenomenon that the shutter blade temporarily covers the lower region of the opening 1a. Thus, according to the embodiment, the exposure for the next shooting can be immediately carried out just after the four blades 18 to 21 fully open the opening 1a, the shutter chance for the next shooting may not be given away that much. Also, while the next shooting can be early started, because of the elimination of uneven exposure due to the above-mentioned phenomenon, continuous shooting can be advantageously performed.

In the above-description, when any one of detected signals of the two optical sensors 22 and 23 is switched from the H-level to the L-level, the drive current of the DC motor 12 is cut off; alternatively, the drive current may be gradually limited as shown by broken lines A and B in FIG. 7. In this case, the electric current supplied continuously may be gradually reduced from one time, or the duty ratio of the pulsed current supplied may be reduced by reducing the pulse duration from one time. Moreover, the electric current supplied continuously may be pulsed from one time so as to reduce the duty ratio thereof. According to the embodiment, the two optical sensors 22 and 23 are provided; alternatively, any one of them may be provided. In such a case, if the drive current is limited or cut off when the detected signal is switched from the H-level to the L-level, only image information can be early transmitted for the case of only the sensor 22 while the early initiation of the next shooting and elimination of the uneven exposure are only enabled for the case of only the sensor 23. This is the same as in a third embodiment which will be described later.

Second Embodiment

Next, a second embodiment will be described. FIG. 8 is a plan view showing a substantially half-closed state of the exposure opening of a shutter blade according to the second embodiment after starting the closing operation from the initial state shown in FIG. 3 in the same way as in the shutter blade according to the first embodiment; FIG. 9 is a timing chart for illustrating the operation according to the embodiment. Whereas the shutter according to the first embodiment has the two optical sensors 22 and 23, the shutter according to the second embodiment includes one optical sensor 24 as shown in FIG. 8. Other structures of this embodiment are the same as those of the first embodiment, so that in FIG. 8, like reference numerals designate like components common to each embodiment.

The optical sensor 24 according to the embodiment is a photo-reflector with the same structure as in the optical sensors 22 and 23 according to the first embodiment. The optical sensor 24, as shown in FIG. 8, is mounted on the shutter base board 1 at a substantially intermediate position of the opening 1a in the vertical direction. In other words, the optical sensor 24 is located at a position capable of detecting the state of the opening 1a, substantially half of which is covered with the four shutter blades 18 to 21. An electronic circuit (not shown) is provided with a delay circuit, so that the drive current of the DC motor 12 is limited or cut off after a lapse of predetermined time from the detection by the optical sensor 24.

Then, the operation according to the embodiment will be described with reference to FIGS. 8 and 9, and in addition to these, FIGS. 3 to 6 are also applied thereto. In this case, the optical sensors 22 and 23 in FIGS. 3 to 6 are regarded as the optical sensor 24 shown in FIG. 8. The operations common to the first embodiment will be described as simple as possible.

According to the embodiment, the initial state is also as shown in FIG. 3, and in this state, the detected signal of the optical sensor 24 according to the embodiment is at the H-level, and with the liquid crystal display, object images can be observed. Upon imaging, when the release button is pushed, an electric charge stored in the solid imaging element is discharged and an electric charge for imaging starts being stored. After a lapse of predetermined time, by a signal from the exposure-time control circuit, a drive current is supplied to the DC motor 12. Thereby, the rotor of the DC motor 12 rotates in a positive direction so as to counterclockwise rotate the drive member 15 arranged integrally with the output shaft 12a, so that the four blades 18 to 21 start moving upward.

Then, when the four blades 18 to 21 become the state shown in FIG. 8 after the state shown in FIG. 4, the signal from the optical sensor 24 is switched from the H-level to the L-level so as to start actuating the delay circuit. Thereafter, when the four blades 18 to 21 are further elevated so as to become the state shown in FIG. 5, a predetermined delay time X1 (see FIG. 9) is finished so that the drive current supplied to the DC motor 12 is cut off. Hence, thereafter the rotor of the DC motor 12, the drive member 15, and the shutter blade operate only by inertia, and then are braked by the abutment of the drive pin 15a of the drive member 15 to the bent portion 6b of the brake member 6 so as to stop by the abutment of the bent portion 6b of the brake member 6 to the upper end of the elongated hole 1b, as shown in FIG. 6. In such a manner, according to the embodiment, a bound is also suppressed favorably upon stopping, so that image information can be transmitted from the solid imaging element to the memory immediately after the opening 1a is closed while images without unevenness can be obtained.

Then, when the image information is transmitted to the memory, a drive current in the opposite direction is supplied to the DC motor 12 by the terminate signal of the transmission so as to clockwise rotate the output shaft 12a in FIG. 6. Thus, the arm 16 is clockwise rotated via the drive pin 15a so as to downward move the four blades 18 to 21. Then when the four blades 18 to 21 become the state shown in FIG. 8 after the state shown in FIG. 5, the signal from the optical sensor 24 is immediately switched from the L-level to the H-level so as to start actuating the delay circuit.

Then, when the four blades 18 to 21 become the state shown in FIG. 4, a predetermined delay time X2 (see FIG. 9) is finished so that the drive current supplied to the DC motor 12 is cut off. Hence, thereafter the rotor of the DC motor 12, the drive member 15, and the shutter blade operate only by inertia, and are favorably braked by the abutment of the drive pin 15a to the bent portion 6a of the brake member 6 so as to stop without bounding when the bent portion 6a abuts the lower end of the elongated hole 1b. In the stopped state (state shown in FIG. 3), object images can be observed with the liquid crystal display.

In such a manner, according to the embodiment, although one optical sensor is only provided, the same functions as those of the first embodiment having the two optical sensors can be obtained. In the above-description of operations, upon completion of the delay times X1 and X2, the drive current of the DC motor 12 is cut off; alternatively, according to the embodiment, the drive current may be gradually limited as shown in broken lines A and B of FIG. 9 in the same way as in the first embodiment. In this case, the supplying current may be continuously reduced, or a duty may be sequentially reduced. This is the same as in a fourth embodiment which will be described later.

Third Embodiment

Figure 10:
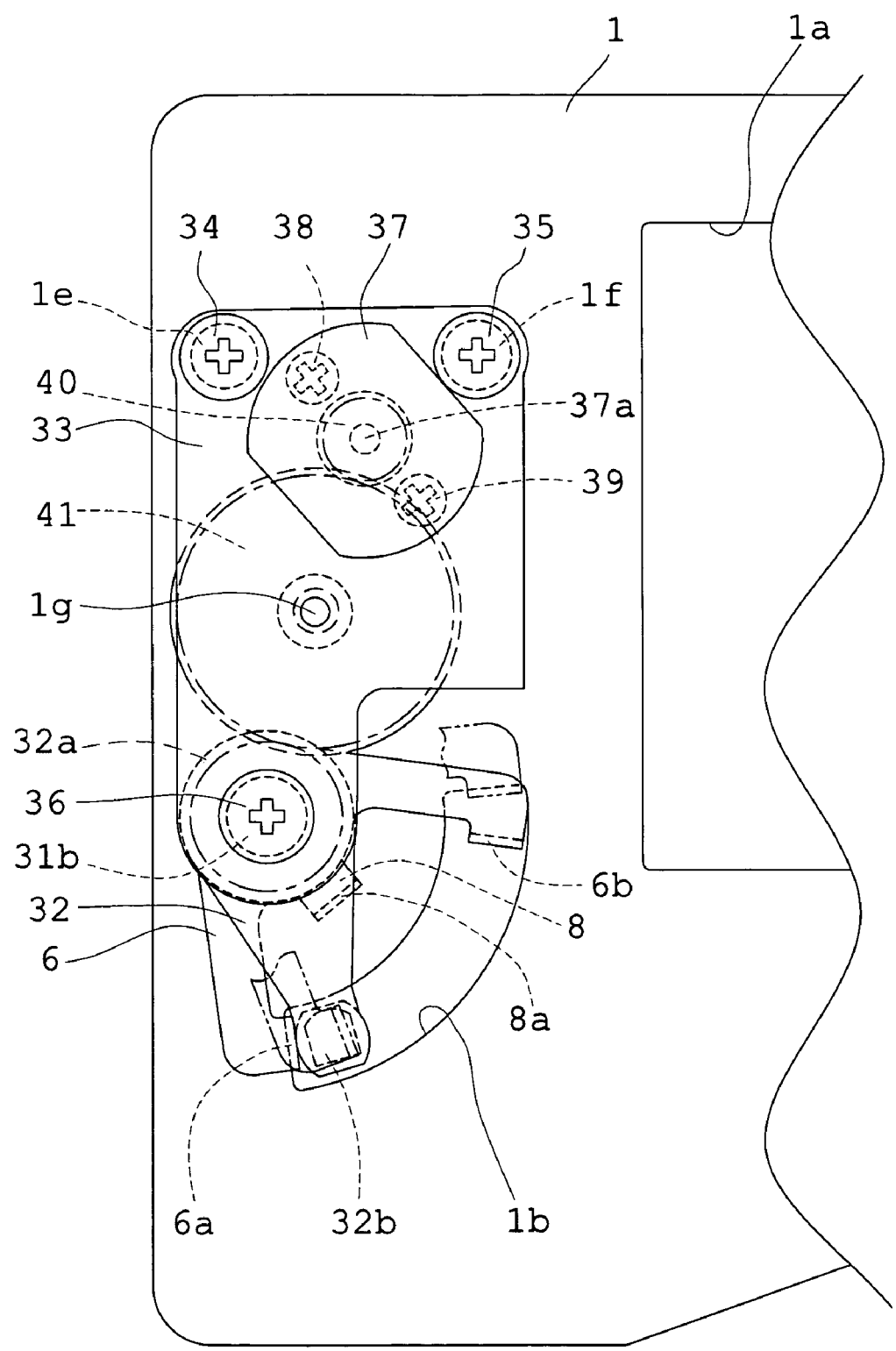
FIG. 10 is a plan view for illustrating a drive device according to a third embodiment according to the present invention.
Figure 11:
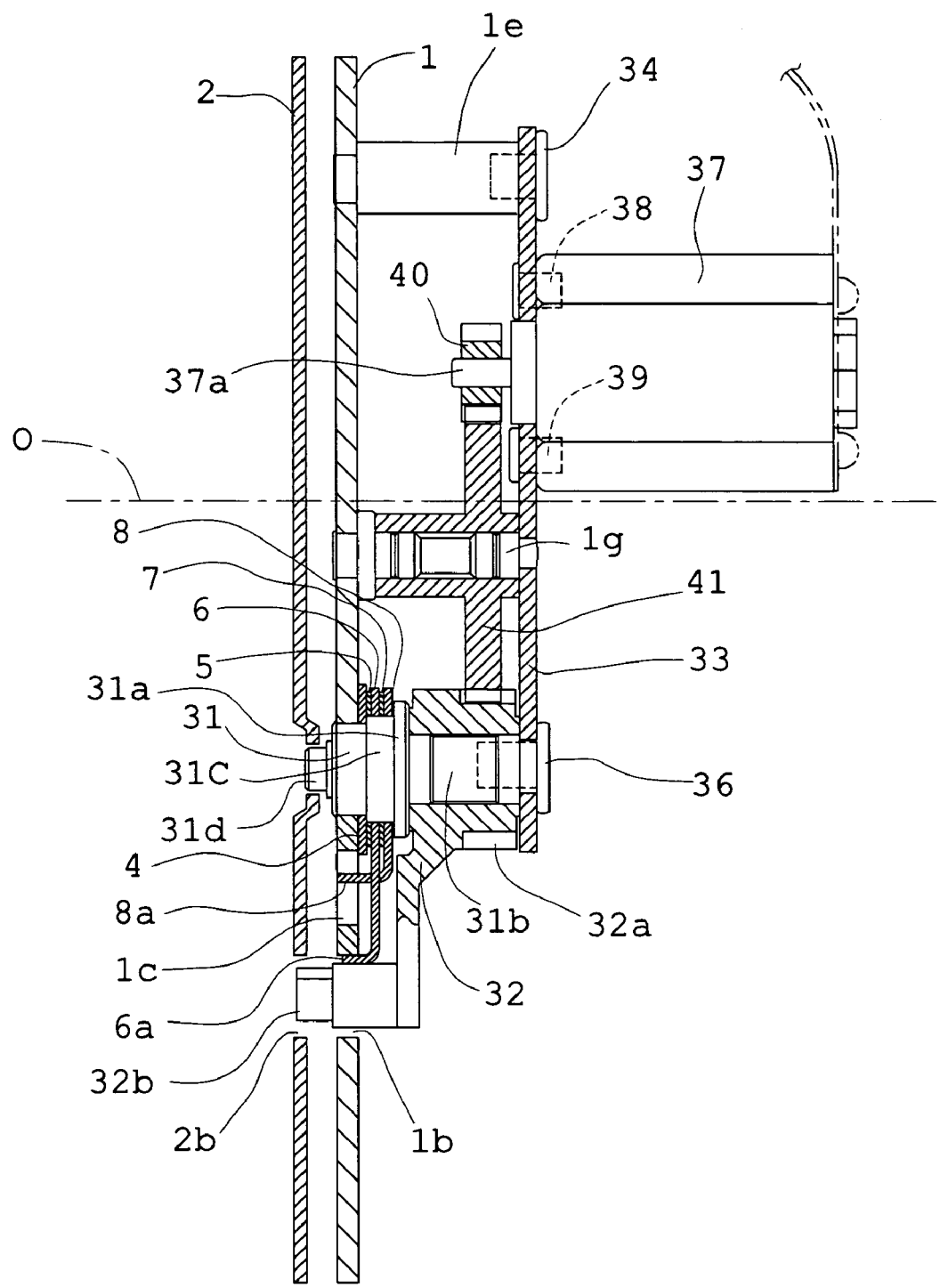
FIG. 11 is a longitudinal sectional view of FIG. 10.
Figure 12:
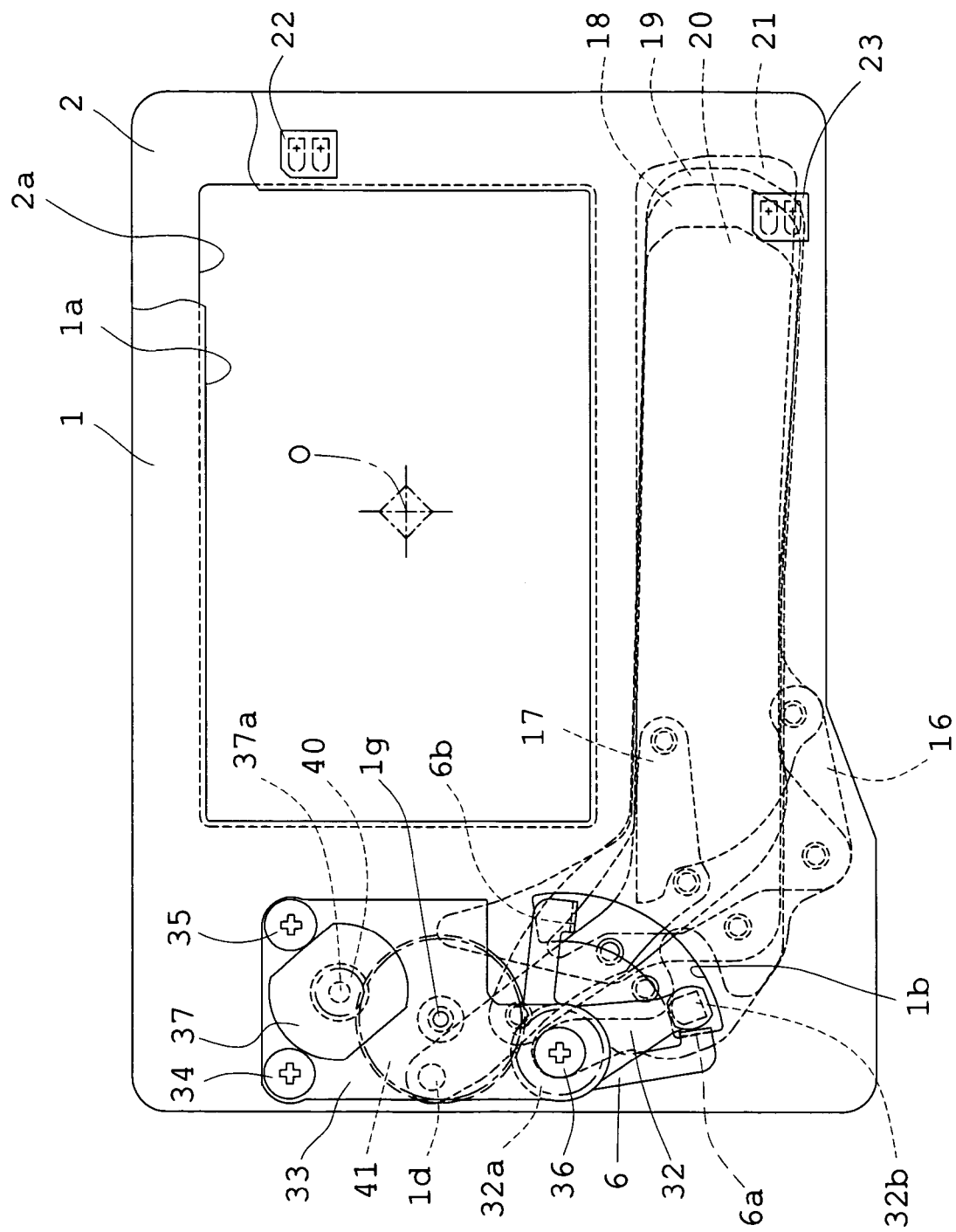
FIG. 12 is a plan view of the third embodiment showing an initial state in that the shutter blade fully opens the exposure opening.
Figure 13:
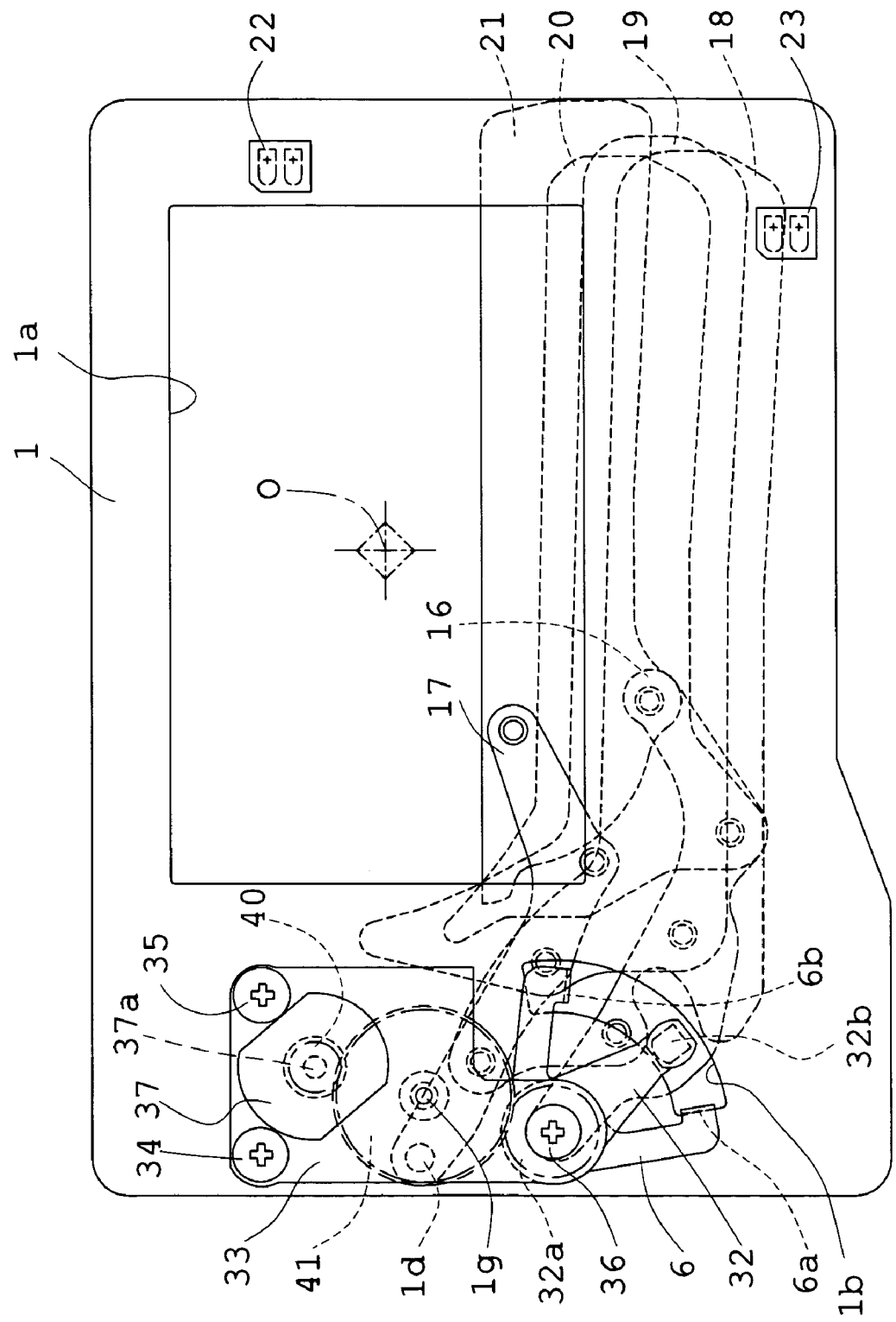
FIG. 13 is a plan view showing a state in that the shutter blade starts closing the exposure opening from the initial state of FIG. 12.

A third embodiment will be described with reference to FIGS. 10 to 15. FIG. 10 is a plan view for illustrating the structure of a drive device according to the third embodiment; FIG. 11 is a longitudinal sectional view of FIG. 10; and FIGS. 12 to 15 are drawings for illustrating the operation according to the embodiment, wherein FIG. 12 is a plan view showing an initial state of a fully-opened exposure opening, FIG. 13 is a plan view showing a state of the exposure opening immediately after a shutter blade starts closing it, FIG. 14 is a plan view showing a state of the exposure opening immediately before the shutter blade finishes closing it, and FIG. 15 is a plan view showing a state of the exposure opening in which the shutter blade stops immediately after finishing to close it. FIG. 7 used for the first embodiment will be also used for illustrating the operation according to the third embodiment.

First, a structure according to the embodiment will be described. In this embodiment, the structure of the shutter blade arranged in the blade chamber is the same as those in the first and second embodiments. The structure of the positional detector for the shutter blade is also the same as that in the first embodiment. Hence, like reference characters designate like elements common to the first embodiment and the description thereof is omitted. Then, the description of this embodiment will be about only the drive device, in which a number of substantially the same elements as those in the first embodiment are used, so that like reference characters designate like elements substantially common to the first embodiment and these will be simply described.

The shutter base board 1 according to the embodiment is provided with the rectangular exposure opening 1a and the circular-arc elongated-hole 1b formed therein. As shown in FIG. 11, on the backside of the shutter base board 1, the auxiliary base board 2 is attached thereto by not shown means at a predetermined interval so as to form the blade chamber between the two boards 1 and 2. The auxiliary base board 2 is also provided with an opening 2a (see FIG. 12) with a size slightly larger than that of the opening 1a and the elongated hole 2b (see FIG. 11) formed at a position overlapping with the elongated hole 1b so as to have substantially the same shape as that of the elongated hole 1b.

As is understood from FIG. 11, on the shutter base board 1, a shaft 31 is erected with the plain washer 4 therebetween by caulking on the blade chamber side. The shaft 31 includes a flange 31a, a first shaft portion 31b, a second shaft portion 31c arranged adjacent the first shaft portion 31b with the flange 31a therebetween, and a third shaft portion 31d arranged inside the blade chamber. The first shaft portion 31b is provided with a tapped hole formed from the end face thereof in the axial direction. On the second shaft portion 31c, in the same way as in the first embodiment, the plate member 5, the brake member 6, the plate member 7, and the spring washer 8 are attached in that order from the side of the shutter base board 1. The two bent portions 6a and 6b of the brake member 6, as shown in FIG. 10, are inserted into the elongated hole 1b of the shutter base board 1, and the bent portion 8a of the spring washer 8 is inserted into the hole 1c (see FIG. 11) of the shutter base board 1 for preventing the rotation.

To the first shaft portion 31b of the shaft 31, a synthetic resin drive member 32 is rotatably attached. The drive member 32 is provided with a gear portion 32a and a drive pin 32b, and the drive pin 31b is inserted into the blade chamber through the elongated hole 1b of the shutter base board 1 so as to fit into an elongated hole (not shown) formed in the arm 16 of the shutter blade. According to the embodiment, during injection molding of the drive member 32, the gear portion 32a is simultaneously formed; alternatively, the gear portion 32a, which is separately made as a metallic annular element, may be integrated during the injection molding of the drive member 32.

On the surface outside the blade chamber of the shutter base board 1, two shafts 1e and 1f are erected so as to have a tapped hole formed on each end face. An installation plate 33 is attached on end faces of the two shafts 1e and 1f and the shaft 31 with three screws 34, 35, and 36. On the installation plate 33, a DC motor 37, which is of the same type as the DC motor 12 but with a higher rotating speed than that, with an output shaft 37a arranged in parallel with the optical axis O, i.e. perpendicularly to the shutter base board 1, is attached with two screws 38 and 39. The output shaft 37a is provided with a spur gear 40 integrally attached thereto. On the shutter base board 1, a shaft 1g is erected so as to fit its end into a hole of the installation plate 33. In the shaft 1g, a spur gear 41 is rotatably attached so as to reduce the rotation of the spur gear 40 for transmitting it to the drive member 32.

Then, the operation according to the embodiment will be described with reference to FIGS. 12 to 15 and FIG. 7 in addition to these. Since the operation sequence is very similar to that of the first embodiment, common features will be simply described. According to the embodiment, the normally open operating system is also adopted, so that the initial state (imaging stand-by state) of the shutter blade is that the opening 1a is fully opened as shown in FIG. 12. At this time, the drive member 32 is located at a rotation limited position in the clockwise direction, and the drive pin 32b brings the bent portion 6a of the brake member 6 into contact with the lower end of the elongated hole 1b. Also, as shown in FIG. 7, at this time, the detected signal of the optical sensor 22 becomes the H-level while the detected signal of the optical sensor 23 becomes the L-level.

Upon imaging, when the release button is pushed, an electric charge stored in the solid imaging element is discharged and an electric charge for imaging starts being stored. After a lapse of predetermined time, by a signal from the exposure-time control circuit, a drive current is supplied to the DC motor 37. Thereby, the rotor of the DC motor 37 rotates in a positive direction (counterclockwise in FIG. 12) so as to clockwise rotate the reducing spur gear 41 via the spur gear 40 attached to the output shaft 37a. Thus, the drive member 32 mated with the spur gear 41 via the gear portion 32a is counterclockwise rotated so as to counterclockwise rotate the arm 16 with the drive pin 32b. As a result, the four blades 18 to 21 start moving upward. When the blade 18 is further moved upward from the state of FIG. 13, the detected signal of the sensor 23 is switched from the L-level to the H-level.

Thereafter, when the four blades 18 to 21 are further elevated so as to become the state shown in FIG. 14, the detected signal of the optical sensor 22 is switched to the L signal. Thus, the drive current supplied to the DC motor 37 is cut off, and then the rotor of the DC motor 37, the spur gear 40, the spur gear 41, the drive member 32, and the shutter blade operate only by inertia. Immediately thereafter, the drive pin 32b abuts the bent portion 6b of the brake member 6 so as to counterclockwise rotate the brake member 6. Hence, the rotation of the drive member 32 is braked thereafter, so that immediately after the four blades 18 to 21 completely close the opening 1a, the drive member 32 is stopped by the abutment of the bent portion 6b to the upper end of the elongated hole 1b. FIG. 15 shows the stopped state. According to the embodiment, the drive member 32 does not bound when the bent portion 6b abuts the upper end of the elongated hole 1b, so that in such a closed state, imaging information is immediately transmitted from the solid imaging element to the memory, obtaining images without uneven exposure.

When the imaging information is transmitted to the memory in such a manner, by its completion signal, a drive current in the opposite direction is supplied to the DC motor 37 so as to rotate the spur gear 40 attached to the output shaft 37a in the clockwise direction shown in FIG. 15. Thereby, the drive pin 32b of the drive member 32, which is clockwise rotated via the spur gear 41, rotates the arm 16 clockwise, so that the four blades 18 to 21 start moving downward. When the blade 21 further descends from the state shown in FIG. 14, the detected signal of the optical sensor 22 is switched from the L-level to the H-level. Hence, from this step, any one of detected signals of the optical sensors 22 and 23 is switched to the H-level.

Then, when the four blades 18 to 21 become the state of FIG. 13 by further descending, the detected signal of the optical sensor 23 is switched to the L-level. Hence, the drive current supplied to the DC motor 37 is cut off, and thereafter, the rotor of the DC motor 37, the spur gear 40, the spur gear 41, the drive member 32, and the shutter blade operate only by inertia. Immediately thereafter, the drive pin 32b abuts the bent portion 6a of the brake member 6 so as to clockwise rotate the brake member 6, so that the operation is braked, and the drive member 32 is stopped by the abutment of the bent portion 6a to the lower end of the elongated hole 1b. This stopped state is the initial state shown in FIG. 12. According to the embodiment, when the bent portion 6a of the brake member 6 abuts the lower end of the elongated hole 1b, the drive member 32 does not bound, so that the exposure for the next shooting can be immediately carried out just after the opening 1a is fully opened. Thus, the shutter chance for the next shooting may not be given away and continuous shooting can also be advantageously performed.

According to the embodiment, there is provided the spur gear 41 for reduction; alternatively, if the spur gear 40 is directly mated with the gear portion 32a of the drive member 32 by increasing the diameter of the spur gear 40, the spur gear 41 may be eliminated. However, when the spur gear 41 is provided for reduction like in this embodiment, the degree of freedom in positional arrangement of the DC motor 37 is increased, and this is advantageous in designing cameras. This is the same as the case where while the low-speed DC motor 12 according to the first and second embodiments is used instead of the DC motor 37 according to the embodiment, a gear with the same diameter as that of the spur gear 40 is used instead of the spur gear 41. When the DC motor 37 according to the embodiment is a DC motor with a reduction gear, the spur gear 41 can be eliminated even when the diameter of the spur gear 40 is not increased. Furthermore, when the DC motor with a reducer is used, the drive member 32 without the gear portion 32a like in the first and second embodiments can be directly attached to the output shaft. The present invention incorporates these entire manners and this is the same as in the following fourth embodiment.

Fourth Embodiment

Next, a fourth embodiment will be described. Whereas the shutter according to the third embodiment has the two optical sensors 22 and 23, a shutter according to the fourth embodiment includes one optical sensor 24 as shown in FIG. 16. Other structures of this embodiment are the same as those of the third embodiment, so that in FIG. 16, like reference numerals designate like components common to each embodiment. FIG. 16 is a plan view showing a substantially half-closed state of the exposure opening of a shutter blade according to the forth embodiment after starting the closing operation from the initial state shown in FIG. 12 in the same way as in the shutter blade according to the third embodiment.

The optical sensor 24 according to the embodiment is a photo-reflector with the same structure as in the optical sensors 22 and 23 according to the third embodiment. The optical sensor 24, in the same way as shown in FIG. 8, is mounted at a position capable of detecting the state of the opening 1a, substantially half of which is covered with the four shutter blades 18 to 21. The shutter according to the embodiment, in the same way as in the second embodiment, is also provided with a delay circuit, so that the drive current of the DC motor 37 is limited or cut off after a lapse of predetermined time from the switching of the optical sensor 24.

Then, the operation according to the embodiment will be described with reference to FIG. 16, and in addition to this, FIGS. 12 to 15 used in the third embodiment and FIG. 9 used in the second embodiment are also applied thereto. In this case, the optical sensors 22 and 23 in FIGS. 12 to 15 are regarded as the optical sensor 24 shown in FIG. 16.

The initial state according to the embodiment is the state shown in FIG. 12, and at this time, the detected signal of the optical sensor 24 is the H-level. In this state, when the release button is pushed, an electric charge stored in the solid imaging element is discharged and an electric charge for imaging starts being stored. After a lapse of predetermined time, by a signal from the exposure-time control circuit, a drive current is supplied to the DC motor 37. Thereby, the rotor of the DC motor 37 rotates in a positive direction so as to counterclockwise rotate the spur gear 40 integral with the output shaft 37*a*, so that the arm 16 is counterclockwise rotated via the spur gear 41 and the drive member 32, upward moving the four blades 18 to 21.

Then, when the four blades 18 to 21 become the state shown in FIG. 16 after the state shown in FIG. 13, the signal from the optical sensor 24 is switched from the H-level to the L-level so as to start actuating the delay circuit. Thereafter, when the four blades 18 to 21 are further elevated so as to become the state shown in FIG. 14, a predetermined delay time X (see FIG. 9) is finished so that the drive current supplied to the DC motor 37 is cut off. Hence, thereafter the rotor of the DC motor 37, the spur gear 40, the spur gear 41, the drive member 32, and the shutter blade operate only by inertia, and then are braked by the abutment of the drive pin 32*b* of the drive member 32 to the bent portion 6*b* of the brake member 6 so as to stop by the abutment of the bent portion 6*b* of the brake member 6 to the upper end of the elongated hole 1*b*, as shown in FIG. 15. In such a manner, according to the embodiment, a bound is also suppressed favorably upon stopping, so that image information without unevenness can be transmitted from the solid imaging element to the memory immediately after the opening 1*a* is closed.

When the imaging information is transmitted to the memory in such a manner, by its completion signal, a drive current in the opposite direction is supplied to the DC motor 37 so as to rotate the spur gear 40 integral with the output shaft 37*a* in the clockwise direction shown in FIG. 15. Thereby, the arm 16 is clockwise rotated via the spur gear 41 and the drive member 32, downward moving the four blades 18 to 21. Then, when the four blades 18 to 21 become the state shown in FIG. 16 after the state shown in FIG. 14, the signal from the optical sensor 24 is switched from the L-level to the H-level so as to start actuating the delay circuit.

Thereafter, when the four blades 18 to 21 become the state shown in FIG. 13, a predetermined delay time X (see FIG. 9) is finished so that the drive current supplied to the DC motor 37 is cut off. Hence, thereafter the rotor of the DC motor 37, the spur gear 40, the spur gear 41, the drive member 32, and the shutter blade operate only by inertia, and are favorably braked by the pushing of the drive pin 32*b* of the drive member 32 to the bent portion 6*a* of the brake member 6, so that the drive member 32 becomes the state of FIG. 12, and stops without bounding when the bent portion 6*a* of the brake member 6 abuts the lower end of the elongated hole 1*b*. Thus, according to the embodiment, the next shooting can also be immediately carried out just after the opening 1*a* is fully opened, so that the next shooting can be immediately started. Hence, the shutter chance for the next shooting may not be given away and continuous shooting can be advantageously performed.

According to the embodiments described above, the DC motors 12 and 37 are attached to the shutter base board 1 with the output shafts 12*a* and 37*a* arranged in parallel with the optical axis O, respectively; however, the present invention is not limited to this manner, so that the DC motor may also be attached perpendicularly to the optical axis O (i.e. in parallel with the shutter base board 1) by interposing a worm and a worm wheel therebetween. According to the embodiments described above, one or two optical sensors are used as positional detecting means of the shutter blade; however, the detecting means according to the present invention is not limited to the optical sensor, so that other non-contact sensors such as a magnetic sensor may also be used. Among the optical sensors, in addition to the photo-reflector, which is described in the embodiments and receives reflected light, there may be a type of directly receiving emitted light from the emission part. The optical sensor according to the present invention may be any of these sensors.

Fifth Embodiment

Figure 17:
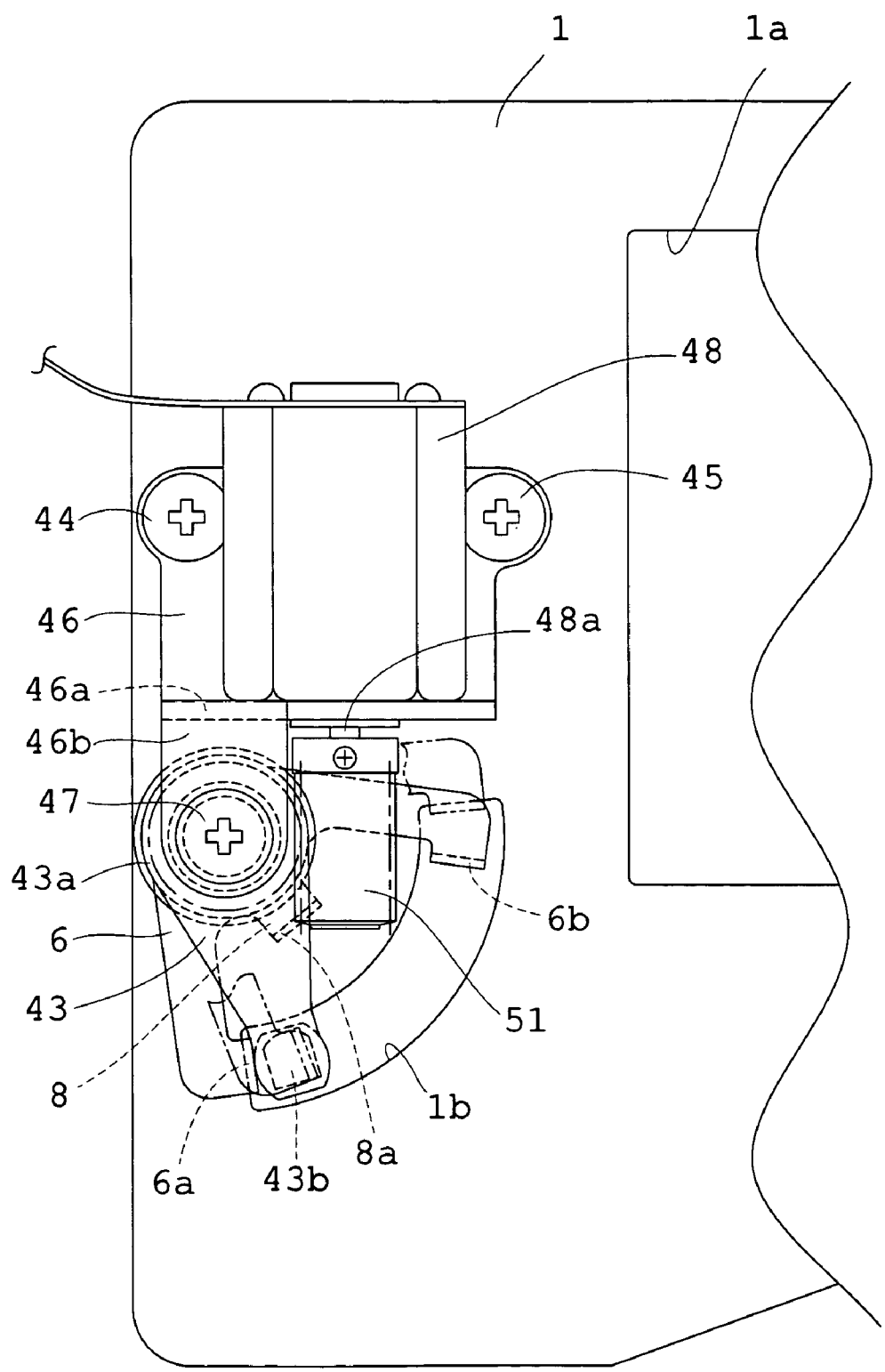
FIG. 17 is a plan view for illustrating a drive device of a fifth embodiment according to the present invention.
Figure 18:
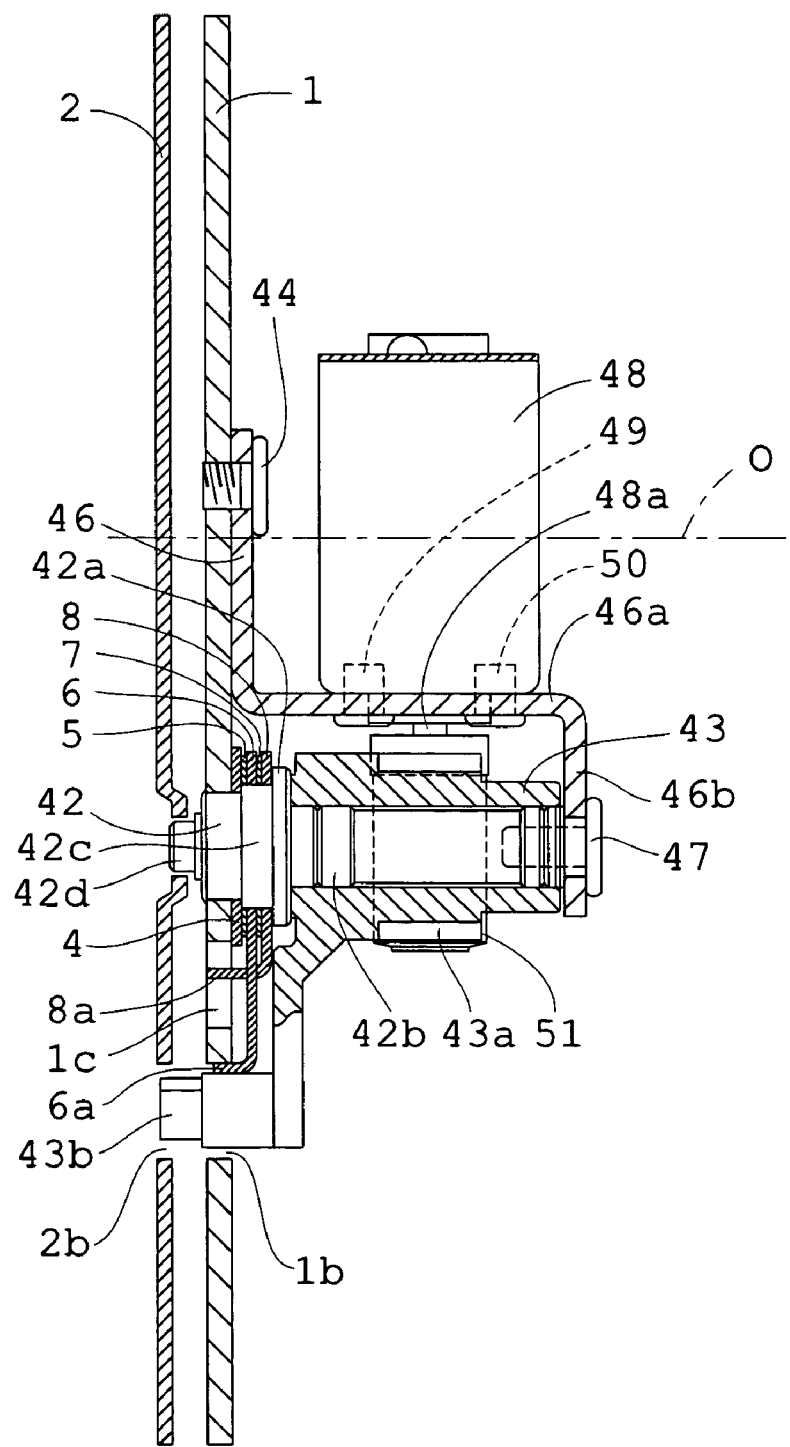
FIG. 18 is a longitudinal sectional view of FIG. 17.
Figure 19:
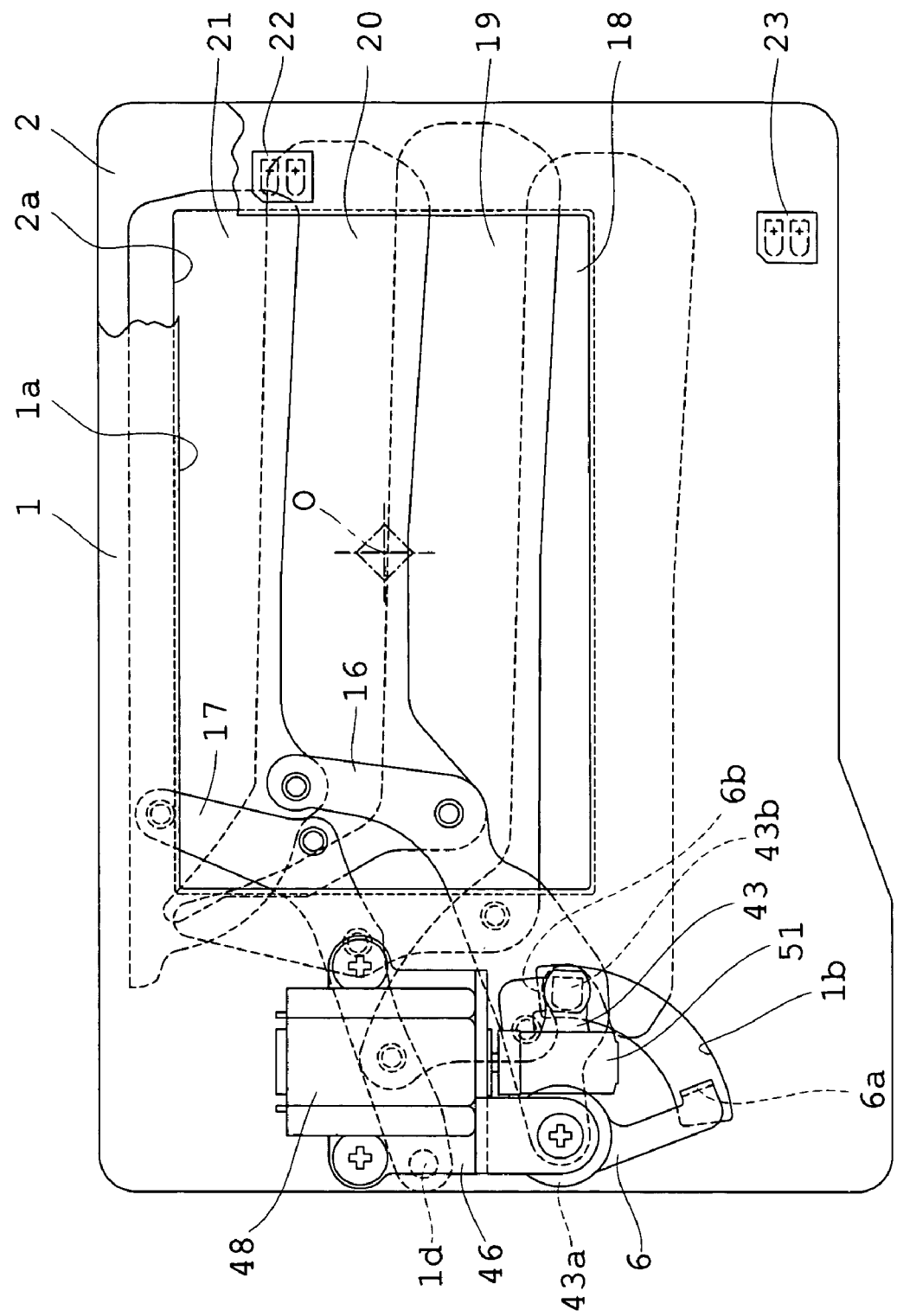
FIG. 19 is a plan view of the fifth embodiment showing an initial state in that the shutter blade fully closes the exposure opening.
Figure 20:
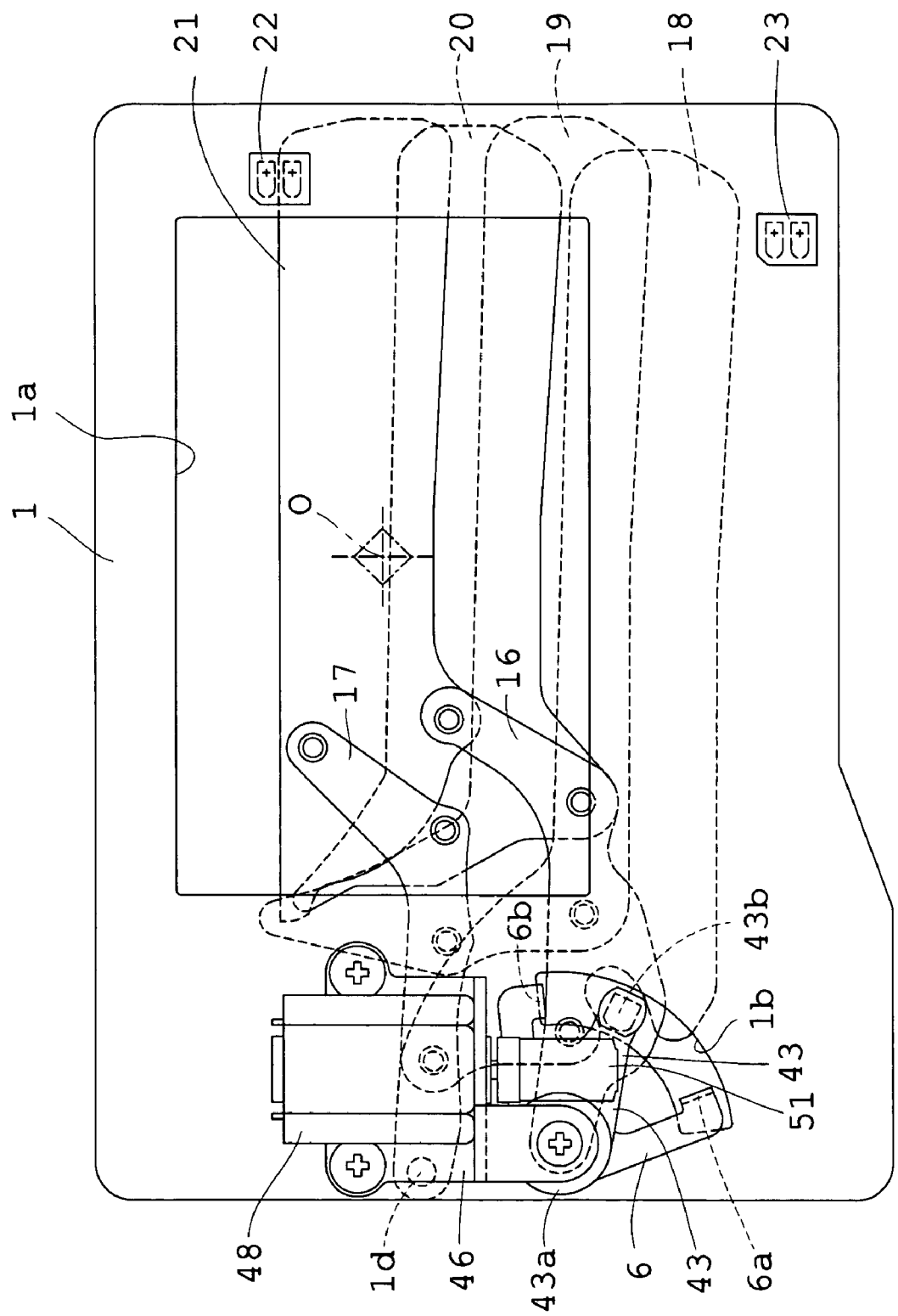
FIG. 20 is a plan view of the fifth embodiment showing a state immediately after the shutter blade starts opening the exposure opening from the state of FIG. 17.
Figure 21:
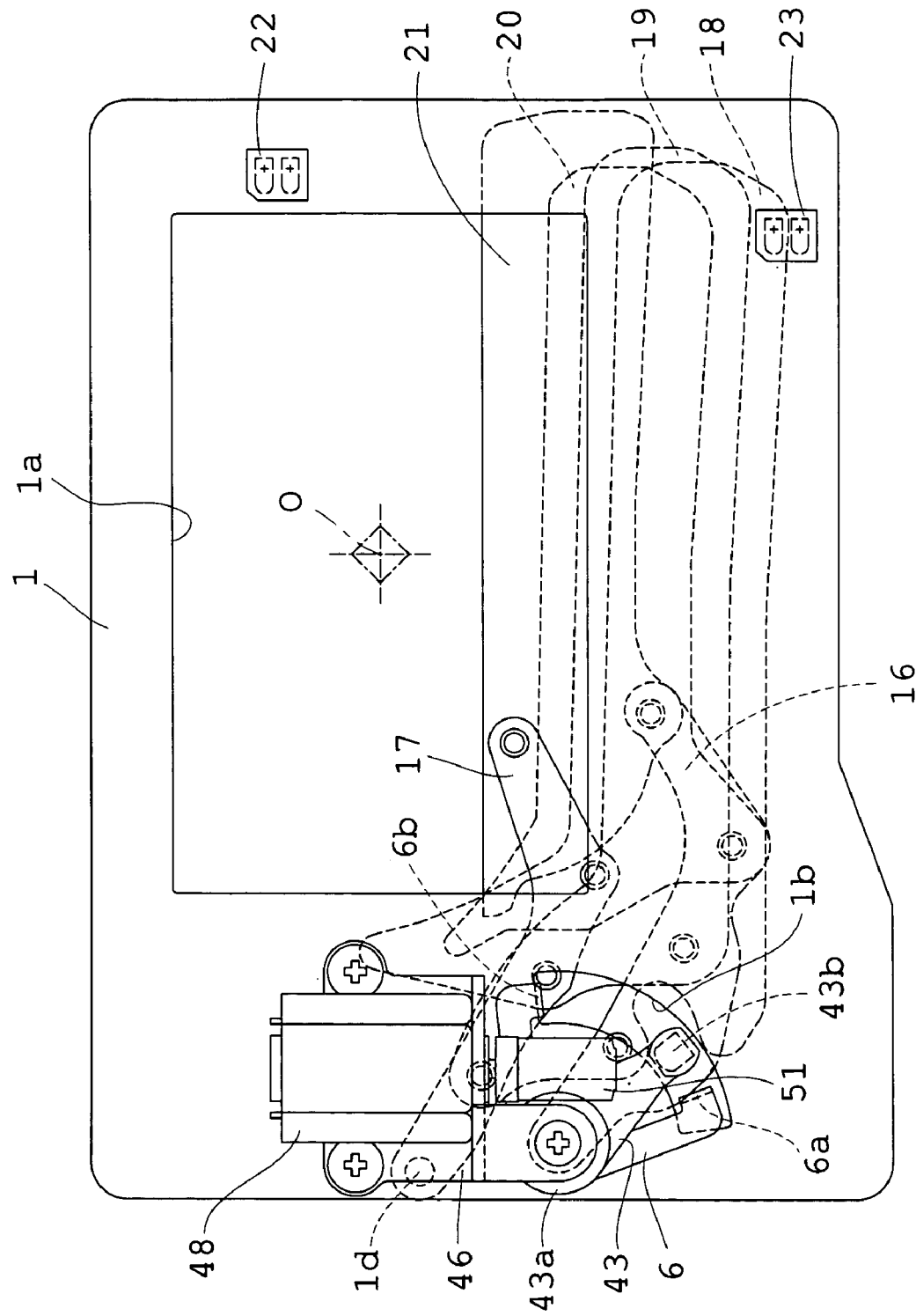
FIG. 21 is a plan view of the fifth embodiment showing a state immediately before the shutter blade fully opens the exposure opening.
Figure 22:
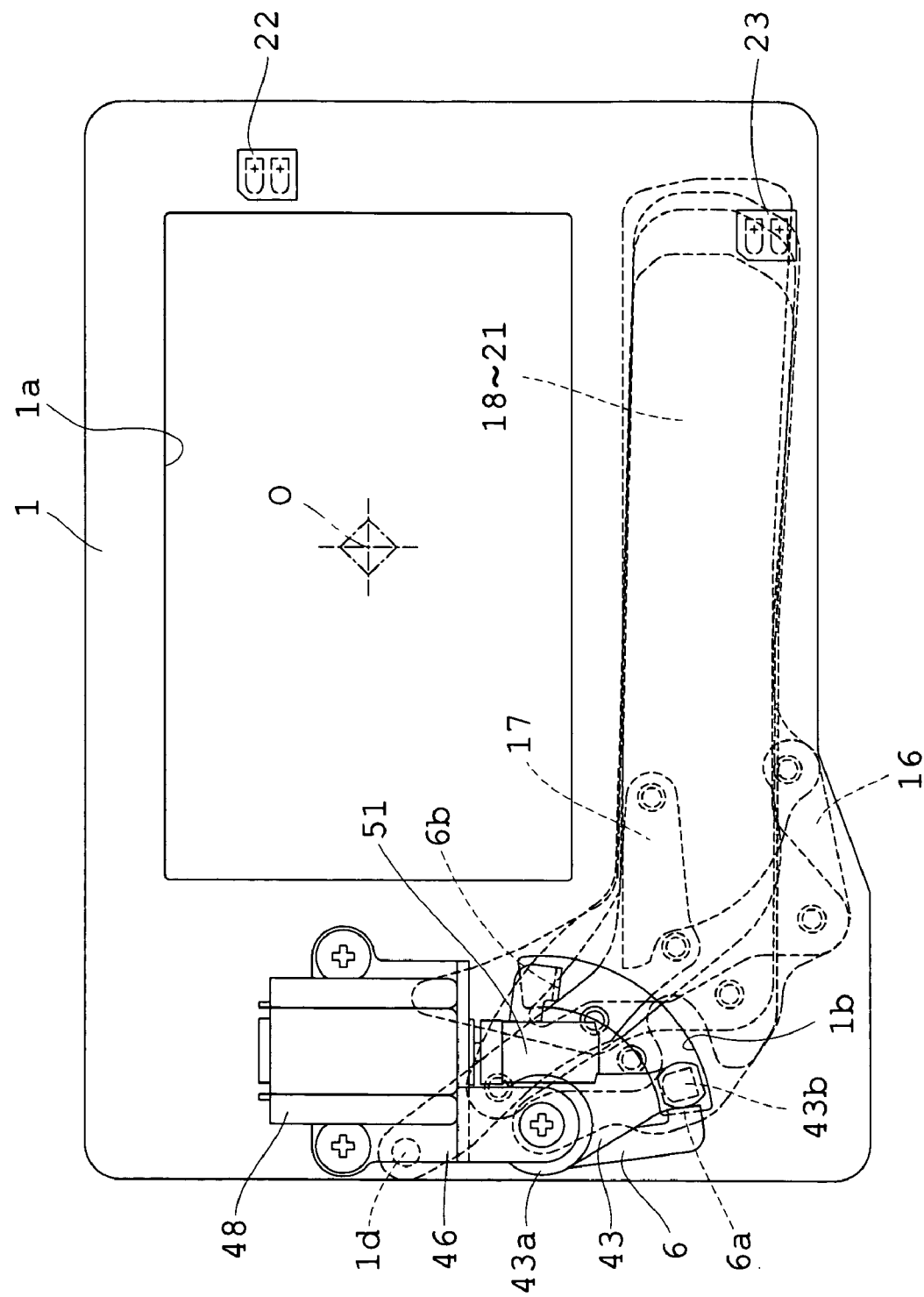
FIG. 22 is a plan view of the fifth embodiment showing a state in that the shutter blade fully opens the exposure opening and stops thereafter.
Figure 23:
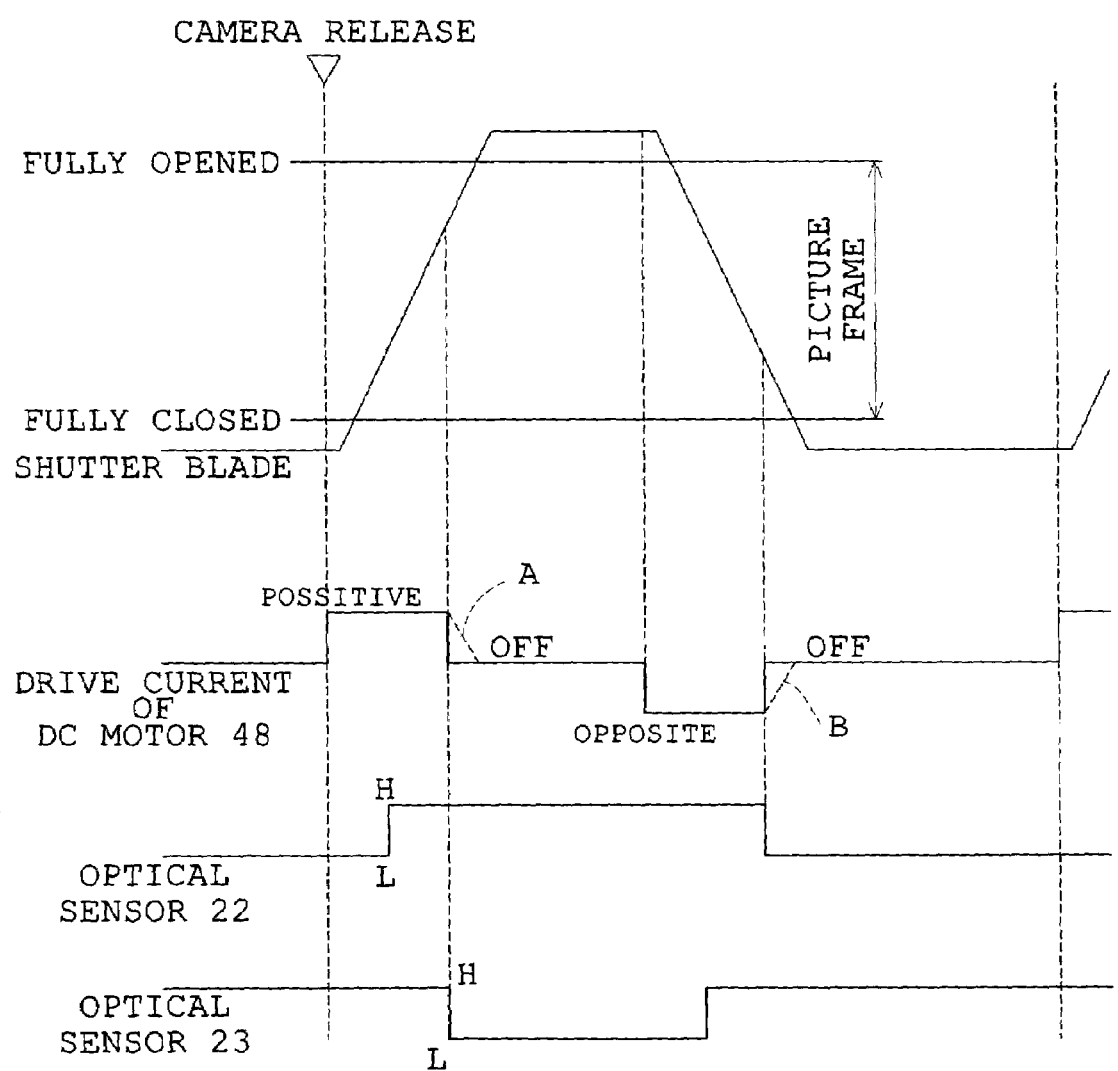
FIG. 23 is a timing chart for illustrating the operation according to the fifth embodiment.
Figure 24:
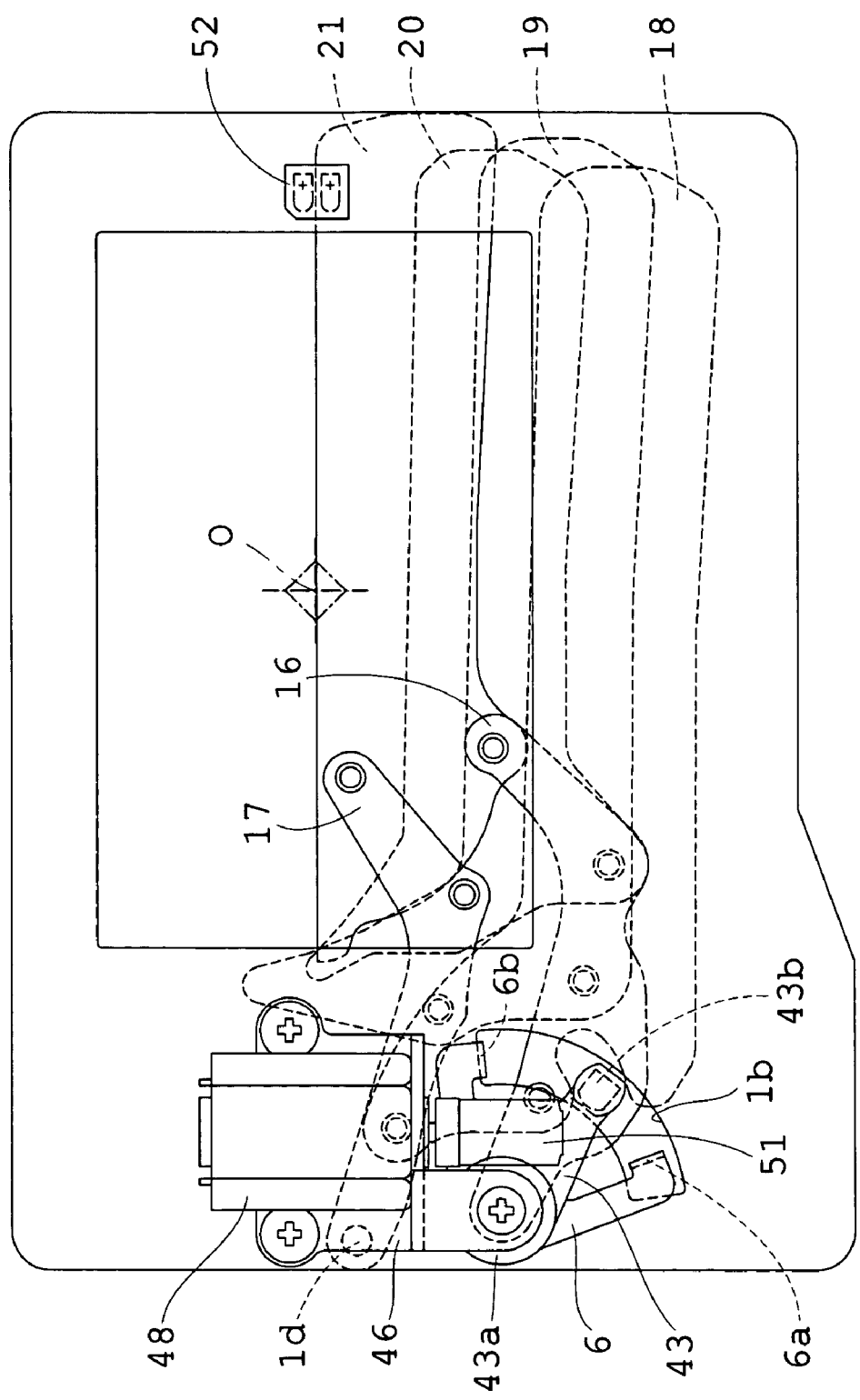
FIG. 24 is a plan view of a sixth embodiment according to the present invention showing a state that the shutter blade opens the exposure opening by about half.
Figure 25:
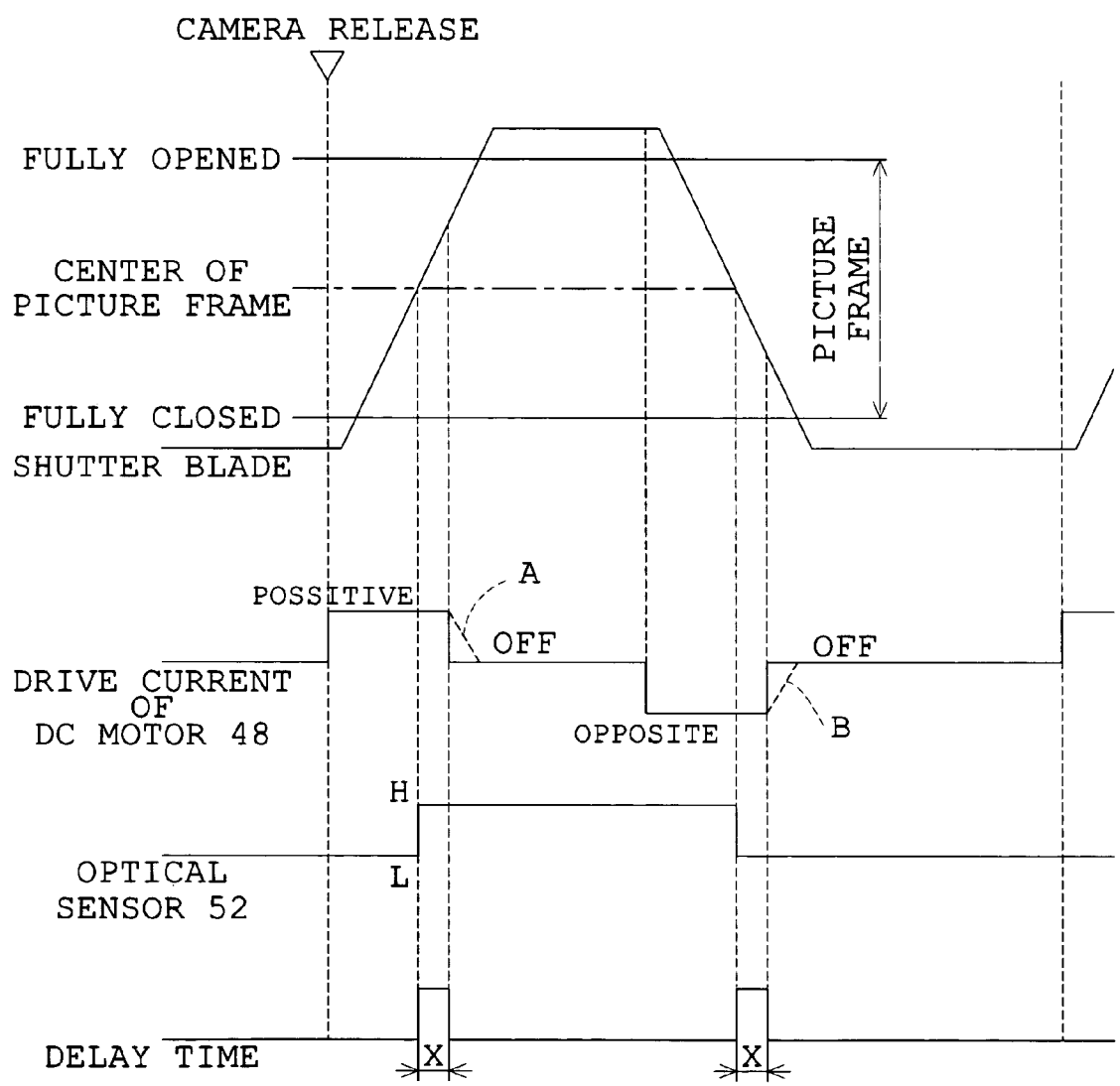
FIG. 25 is a timing chart for illustrating the operation according to the sixth embodiment.

Next, a fifth embodiment will be described. FIG. 17 is a plan view for illustrating the structure of a drive device according to the fifth embodiment; and FIG. 18 is a longitudinal sectional view of FIG. 17, wherein this drive device is also quoted as a drive device according to a sixth embodiment. FIGS. 19 to 23 are drawings for illustrating the operation according to the fifth embodiment, wherein FIG. 19 is a plan view showing an initial state in that a shutter blade fully closes the exposure opening, FIG. 20 is a plan view showing a state of the exposure opening immediately after the shutter blade starts opening it, FIG. 21 is a plan view showing a state of the exposure opening immediately before the shutter blade fully opens it, FIG. 22 is a plan view showing a state of the exposure opening in that the shutter blade stops after finishing to close it, and FIG. 23 is a timing chart. Moreover, FIGS. 24 and 25 are drawings for explaining a sixth embodiment, wherein FIG. 24 is a plan view showing a state in that the shutter blade opens substantially half the exposure opening, and FIG. 25 is a timing chart for explaining the movement of the shutter blade.

As is understood from FIG. 18, on the shutter base board 1, a shaft 42 is erected with the plain washer 4 therebetween by caulking. The shaft 42 includes a flange 42*a*, a first shaft portion 42*b*, a second shaft portion 42*c* arranged adjacent the first shaft portion 42*b* with the flange 42*a* therebetween, and a third shaft portion 42*d* arranged inside the blade chamber. The first shaft portion 42*b* is provided with a tapped hole formed from the end face thereof in the axial direction. On the second shaft portion 42*c*, the plate member 5, the brake member 6, the plate member 7, and the spring washer 8 are attached in that order from the side of the shutter base board 1.

Among them, the spring washer 8 pushes the brake member 6 toward the plain washer 5 so as to apply a frictional force to the rotation of the brake member 6. By inserting a bent portion 8*a* of the spring washer 8 into a hole 1*c* of the shutter base board 1, the spring washer 8 is prevented from rotating together with the brake member 6. The two plate members 5 and 7 made of a synthetic resin function to increase a frictional force when the brake member 6 rotates. Furthermore, the brake member 6, as shown in FIG. 17, has a V planar shape with bent portions 6*a* and 6*b* formed at ends of two arms and inserted into the elongated hole 1*b* formed in the shutter base board 1.

To the first shaft portion 42*b* of the shaft 42, a synthetic resin drive member 43 is rotatably attached. The drive member 43 is provided with a worm wheel 43*a* and a drive pin 43*b*, and the drive pin 43*b* is inserted into the blade chamber through the elongated hole 1*b* of the shutter base board 1. According to the embodiment, during injection molding of the drive member 43, the worm wheel 43*a* is simultaneously formed; alternatively, the worm wheel 43*a*, which is separately made as a metallic annular element, may be integrated during the injection molding of the drive member 43.

On the surface of the shutter base board 1 outside the blade chamber, an installation plate 46 is attached with two screws 44 and 45. The installation plate 46 includes an installation portion 46*a* bent perpendicularly to the shutter base board 1 and a bent portion 46*b* bent in parallel to the shutter base board 1. The bent portion 46*b* is attached on the end face of the shaft 42 with a screw 47. In the installation portion 46*a*, a DC motor 48 with an output shaft 48*a* arranged perpendicularly to the optical axis O is attached with two screws 49 and 50. To the output shaft 48*a*, a worm 51 is attached so as to mate with the worm wheel 43*a* of the drive member 43.

Then, the structure of the shutter blade arranged in the blade chamber will be described with reference to FIG. 19. The shutter blade according to the embodiment is composed of the two arms 16 and 17, and the four blades 18, 19, 20, and 21. The arm 16 is rotatably attached to the third shaft portion 42*d* (see FIG. 2) at one end in the longitudinal direction as a pivotal point, and the drive pin 43*b* is fitted into the elongated hole (not shown). The arm 17 is rotatably attached to the shaft 1*d* provided in the shutter base board 1 on the blade chamber side. The four blades 18, 19, 20, and 21 are sequentially pivoted to both the arms 16 and 17 from the pivotal ends toward the other ends.

Finally, the positional detector of the shutter blade will be described. On the surface of the shutter base board 1 outside the blade chamber, the two optical sensors 22 and 23 are attached. These optical sensors 22 and 23 are known photoreflectors, and emission and receiving parts of each sensor face the blade chamber from a hole (not shown) formed in the shutter base board 1. The regions corresponding to the optical sensors 22 and 23 on the surface of the auxiliary base board 2 on the blade chamber side are reflection surfaces, and light emitted from the emission part is incident to the receiving part after reflection on the reflection surface.

Next, the operation according to the embodiment will be described. The shutter according to the embodiment can also be operated according to any one of the sequences of normally open and normally closed in the same way as in the other embodiments. The case of the operation according to the normally closed sequence will be only described below with reference to FIGS. 19 to 23.

FIG. 19 shows an initial state in that the shutter blade fully closes the opening (exposure opening). At this time, the drive member 43 is located at a rotation limited position in the counterclockwise direction, and the drive pin 43*b* brings the bent portion 6*b* of the brake member 6 into contact with the upper end of the elongated hole 1*b*. At this time, in the optical sensor 22, light emitted from the emission part does not enter the receiving part by the existence of the blade 20, so that the detected signal is at the L-level. On the other hand, in the optical sensor 23, light emitted from the emission part enters the receiving part, so that the detected signal is at the H-level. In this initial state, a photographer can observe object images with an optical finder.

Upon imaging, when the release button is pushed, a drive current in a positive direction is supplied to the DC motor 48 so as to clockwise rotate the drive member 43 with the worm 51. Thereby, the drive pin 43*b* rotates the arm 16 in the clockwise direction, so that the four blades 18 to 21 start moving downward while increasing an overlap of adjacent blades. However, the brake member 6 maintains the state shown in FIG. 19 by a frictional force applied by the spring washer 8 even after the drive member 43 started operating. A detected signal of the optical sensor 22 maintains the L-level with the blades 19 and 20 until the four blades 18 to 21 become the state shown in FIG. 20 after continuing to move downward; however, when the blade 21 further descends from the state shown in FIG. 20, light emitted from the emission part is reflected on the auxiliary base board 2 so as to reach the receiving part so that the detected signal is switched to the H-level. Hence, from this step, any one of detected signals of the two optical sensors 22 and 23 is switched to the H-level.

Thereafter, when the four blades 18 to 21 further descend so as to become the state shown in FIG. 21, the detected signal of the optical sensor 23 is switched to the L-level because the light incident to the receiving part until at that time is blocked off by the blade 18. Thus, the drive current supplied to the DC motor 48 is cut off, and then the rotor of the DC motor 48, the drive member 43, and the shutter blade operate only by inertia. Immediately thereafter, the drive pin 43*b* abuts the bent portion 6*a* of the brake member 6 so as to clockwise rotate the brake member 6. Hence, the operations are braked thereafter, and the drive member 43 is stopped by the abutment of the bent portion 6*a* to the lower end of the elongated hole 1*b*. FIG. 22 shows the stopped state, and the opening 1*a* is fully open. In such an open state, an electric charge stored in the solid imaging element is discharged so as to start exposing for imaging.

Incidentally, according to the embodiment, immediately before the shutter blade completely opens the opening 1*a*, the drive current to the DC motor 48 is cut off. Thus, the drive pin 43*b* pushes the brake member 6 only by the inertia thereafter, so that the drive member 43 and the shutter blade are favorably braked in operation, and when the bent portion 6*a* of the brake member 6 abuts the lower end of the elongated hole 1*b*, a bound thereby produced is suppressed, preventing a phenomenon that the shutter blade temporarily covers the lower region of the opening 1*a*. Hence, according to the embodiment, the exposure for imaging can be started immediately after the shutter blade fully opens the opening 1*a* from the state of FIG. 21, so that the shutter chance for the next shooting may not be given away that much. Also, by advancing the initiation of the exposure for imaging, the next shooting can be early started, so that continuous shooting can be advantageously performed.

After a lapse of predetermined time from the initiation of the exposure for imaging in such a manner, by a signal from the exposure-time control circuit, a drive current is supplied to the DC motor 48 in the opposite direction to that before. Thereby, the DC motor 48 rotates in the opposite direction so as to counterclockwise rotate the drive member 43 from the state of FIG. 22, so that the four blades 18 to 21 start moving upward while reducing an overlap of adjacent blades. However, the brake member 6 maintains the state of FIG. 22 even after the operation initiation of the drive member 43. Also, the detected signal of the optical sensor 23 maintains the L-level until the four blades 18 to 21 become the state shown in FIG. 21. When the blade 18 is further moved upward from the state of FIG. 21, the detected signal of the sensor 23 is switched to the H-level.

Then, when the four blades 18 to 21 are further elevated so as to become the state shown in FIG. 20, the detected signal of the optical sensor 22 is switched to the L signal because the light incident to the receiving part until at that time is blocked off by the blade 21. Thus, the drive current supplied to the DC motor 48 is cut off, and then the rotor of the DC motor 48, the drive member 43, and the shutter blade operate only by inertia. Immediately thereafter, the drive pin 43b abuts the bent portion 6b of the brake member 6, which is maintained in the state shown in FIG. 22, so as to counterclockwise rotate the brake member 6. Hence, the operation is braked thereafter, and is stopped by the abutment of the bent portion 6b to the upper end of the elongated hole 1b. Then, when image information is transmitted to the memory in the fully closed state of the opening 1a, the shutter blade becomes the initial state shown in FIG. 19. According to the embodiment, since the bound is favorably suppressed even when the opening 1a is fully closed in such a manner, the upper region of the opening 1a cannot be temporarily opened. Accordingly, imaging information can be early transmitted so that the next shooting can be early carried out that much.

In the above-description, when the detected signal of any one of the optical sensors 22 and 23 is switched from the H-level to the L-level, the drive current of the DC motor 48 is cut off; alternatively, as shown in broken lines A and B of FIG. 23, the drive current may be gradually limited. In this case, the electric current supplied continuously may be gradually reduced from one time, or the duty ratio of the pulsed current supplied may be reduced by reducing the pulse duration from one time. Moreover, the electric current supplied continuously may be pulsed from one time so as to reduce the duty ratio thereof. According to the embodiment, the two optical sensors 22 and 23 are provided; alternatively, any one of them may be provided. In such a case, if the drive current is limited or cut off when the detected signal is switched from the H-level to the L-level, only image information can be early transmitted for the case of only the sensor 22 while the early initiation of the next shooting is only enabled for the case of only the sensor 23.

Sixth Embodiment

Next, a sixth embodiment will be described. Whereas the shutter according to the fifth embodiment has the two optical sensors 22 and 23, the shutter according to the sixth embodiment includes one optical sensor 52 as shown in FIG. 24. The optical sensor 52 according to the embodiment is a photo-reflector with the same structure as in the optical sensors 22 and 23. The optical sensor 52, as shown in FIG. 24, is mounted on the shutter base board 1 at a substantially intermediate position of the opening 1a in the vertical direction. In other words, the optical sensor 52 is located at a position capable of detecting the state of the shutter blade which opens substantially half of the opening 1a. Other structures of this embodiment are the same as those of the fifth embodiment, so that like reference numerals designate like components common to each embodiment. However, an electronic circuit (not shown) is provided with a delay circuit, so that the time until the drive current of the DC motor 48 is limited or cut off is delayed after the detection by the optical sensor 52.

Then, the operation according to the embodiment will be described with reference to FIGS. 24 and 25, and in addition to these, FIGS. 19 to 22 used in the fifth embodiment are also quoted thereto. In this case, the optical sensors 22 and 23 in FIGS. 19 to 22 are obviously regarded as the optical sensor 52 shown in FIG. 24. Also, features common to those of the description of the operation according to the fifth embodiment will be described as simply as possible.

According to the embodiment, the initial state is also as shown in FIG. 19, and at this time, the detected signal from the optical sensor 52 according to the embodiment is at the L-level. A picture taker observes object images with an optical finder in this initial state. Then, when the release button is pushed, a drive current in a positive direction is supplied to the DC motor 48 so as to clockwise rotate the drive member 43 with the worm 51. Thereby, the four blades 18 to 21 start moving downward. A detected signal of the optical sensor 52 maintains the L-level until the four blades 18 to 21 become the state shown in FIG. 24 after continuing to move downward; however, when the blade 21 further descends from the state shown in FIG. 24, the detected signal is switched to the H-level so as to start actuating the delay circuit.

Thereafter, when the four blades 18 to 21 further descend so as to become the state shown in FIG. 21, a predetermined delay time X is finished so that the drive current supplied to the DC motor 48 is cut off. Hence, thereafter the rotor of the DC motor 48, the drive member 43, and the shutter blade operate only by inertia, and then are braked by the abutment of the drive pin 43b to the bent portion 6a of the brake member 6 while clockwise rotating the brake member 6 so as to stop in the sate of FIG. 22 by the abutment of the bent portion 6a to the lower end of the elongated hole 1b. In such a manner, according to the embodiment, a bound is also suppressed favorably upon stopping, so that an electric charge stored in the solid imaging element can be discharged so as to start exposing for imaging immediately after the opening 1a is fully opened.

After a lapse of predetermined time from the initiation of the exposure for imaging, by a signal from the exposure-time control circuit, a drive current is supplied to the DC motor 48 in the opposite direction to that before. Thereby, the DC motor 48 rotates in the opposite direction so as to counterclockwise rotate the drive member 43 from the state of FIG. 22, so that the four blades 18 to 21 start moving upward. When the four blades 18 to 21 become the state shown in FIG. 24, the detected signal of the optical sensor 52 is switched from the H-level to the L-level because light incident to the receiving part up to that time is blocked off by the blade 21 so as to start actuating the delay circuit.

Thereafter, when the four blades 18 to 21 are further elevated so as to become the state shown in FIG. 20, a predetermined delay time X is finished so that the drive current supplied to the DC motor 48 is cut off. Hence, thereafter the rotor of the DC motor 48, the drive member 43, and the shutter blade operate only by inertia, and then are braked by counterclockwise rotating the brake member 6, which has maintained the state of FIG. 22 up to that time, so as to stop by the abutment of the bent portion 6b to the upper end of the elongated hole 1b. In this case, a bound is also suppressed favorably, so that image information can be transmitted to the memory immediately after the opening 1a is closed. Upon finishing the transmission, the shutter blade is returned to the initial state of FIG. 19.

In such a manner, according to the embodiment, although one optical sensor is only provided, the same functions as those of the fifth embodiment having the two optical sensors can be obtained by providing the delay circuit. In the above-description of operations, upon completion of the delay time X, the drive current of the DC motor 48 is cut off;

alternatively, according to the embodiment, the drive current may also be gradually limited as shown in broken lines A and B of FIG. 9. In this case, the supplying current may be continuously reduced, or a duty may be sequentially reduced.

According to the embodiments described above, one or two optical sensors are used as positional detecting means of the shutter blade; however, the detecting means according to the present invention is not limited to the optical sensor, so that other non-contact sensors such as a magnetic sensor may also be used. Among the optical sensors, in addition to the photo-reflector, which is described in the embodiments and receives reflected light, there may be a type of directly receiving emitted light from the emission part. The optical sensor according to the present invention may be any of these sensors.

What is claimed is:

1. A focal plane shutter for a digital still camera, comprising:
    two base boards, each having an exposure opening, arranged to form a blade chamber between both the base boards;
    one shutter blade having a plurality of arms arranged within the blade chamber, one end of each arm being rotatably attached to any one of the base boards, and at least one blade pivoted to the arms;
    a DC motor being reciprocally rotatable and attached to any one of the base boards;
    a drive member, having a drive pin connected to one of the arms, for driving the shutter blade to open and close the opening by being reciprocally rotated by the DC motor; and
    a detecting device for detecting, during movement of the shutter blade, whether the shutter blade reaches a position where the opening is positioned just before a fully opened state and whether the shutter blade reaches a position where the opening is positioned just before a fully closed state,
    wherein, during exposure operation, the shutter blade is driven by the DC motor via the drive member, and
    wherein an electric current for driving the DC motor is interrupted or limited in response to a detection signal of the detecting device.

2. A focal plane shutter according to claim 1, wherein the DC motor is attached to the base board and has an output shaft arranged in parallel with an optical axis, and the drive member is attached to the output shaft.

3. A focal plane shutter according to claim 2, further comprising a bearing member attached to any one of the base boards, and
    wherein an extreme end of the output shaft is journaled by the bearing member.

4. A focal plane shutter according to claim 1, further comprising a spur gear,
    wherein the DC motor is attached to the base board and has an output shaft arranged in parallel with an optical axis, and the spur gear is attached to the output shaft, the drive member being provided with an integrally formed spur gear to be mated with the spur gear attached to the output shaft.

5. A focal plane shutter according to claim 4, further comprising at least one gear interposed between the spur gear attached to the output shaft and the spur gear of the drive member.

6. A focal plane shutter according to claim 4 or 5, wherein the drive member and the spur gear of the drive member are integrally made of a synthetic resin.

7. A focal plane shutter according to claim 1, wherein the DC motor is a DC motor with a reduction gear.

8. A focal plane shutter according to claim 1, wherein the detecting device comprises a first optical sensor for detecting the shutter blade in a vicinity of a position where the opening is fully opened and a second optical sensor for detecting the shutter blade in a vicinity of a position where the opening is fully closed, and
    wherein an electric current for driving the DC motor is interrupted or limited in accordance with detection signals of the first and second optical sensors.

9. A focal plane shutter for digital still cameras comprising:
    two base boards, each having an exposure opening, arranged to form a blade chamber between both the base boards;
    one shutter blade composed of a plurality of arms arranged within the blade chamber, one end of each arm being rotatably attached to any one of the base boards, and a plurality of blades pivoted to the other ends of the arms in order;
    a DC motor being reciprocally rotatable and attached to any one of the base boards and having an output shaft arranged perpendicularly to an optical axis;
    a worm attached to the output shaft;
    a drive member, having a worm wheel to be mated with the worm and a drive pin connected to one of the arms, rotatably attached to any one of the base boards for driving the shutter blade to open and close the opening by being reciprocally rotated by the DC motor; and
    a detecting device for detecting, during movement of the shutter blade, whether the shutter blade reaches a position where the opening is positioned just before a fully opened state and whether the shutter blade reaches a position where the opening is positioned just before a fully closed state,
    wherein, in exposure operation, the shutter blade is driven by the DC motor via the drive member, and
    wherein an electric current for driving the DC motor is interrupted or limited in response to a detection signal of the detecting device.

10. A focal plane shutter according to claim 9, wherein the detecting device comprises a first optical sensor for detecting the shutter blade in a vicinity of a position where the opening is fully opened and a second optical sensor for detecting the shutter blade in a vicinity of a position where the opening is fully closed, and
    wherein an electric current for driving the DC motor is interrupted or limited in accordance with detection signals of the first and second optical sensors.

11. A focal plane shutter for digital still cameras comprising:
    two base boards, each having an exposure opening, arranged to form a blade chamber between both the base boards;
    one shutter blade composed of a plurality of arms arranged within the blade chamber, one end of each arm being rotatably attached to any one of the base boards, and at least one blade pivoted to the arms;
    a DC motor being reciprocally rotatable and attached to any one of the base boards;
    a drive member, having a drive pin connected to one of the arms, for driving the shutter blade to open and close the opening by being reciprocally rotated by the DC motor; and a detecting device for detecting, during movement of the shutter blade, whether the shutter blade reaches a position where the opening is opened by about half, wherein, in exposure operation, the shutter blade is driven by the DC motor via the drive member, and wherein an electric current for driving the DC motor is cut or limited with a detection signal of the detecting device.

12. A focal plane shutter according to claim 11, wherein the DC motor is attached to the base board and has an output shaft arranged in parallel with an optical axis, and the drive member is attached to the output shaft.

13. A focal plane shutter according to claim 11, further comprising a spur gear, wherein the DC motor is attached to the base board and has an output shaft arranged in parallel with an optical axis, and the spur gear is attached to the output shaft while the drive member is provided with an integrally formed spur gear to be mated with the spur gear attached to the output shaft.

14. A focal plane shutter according to claim 11, further comprising a worm, wherein the DC motor is attached to the base board and has an output shaft arranged perpendicularly to an optical axis, and the worm is attached to the output shaft while the drive member is provided with an integrally formed worm wheel to be mated with the worm.

15. A focal plane shutter according to claim 11, further comprising a delay circuit, wherein the detecting device comprises an optical sensor for detecting the shutter blade at a position where the opening is opened by about half, and a detection signal of the optical sensor activates the delay circuit to interrupt or limit, after a lapse of predetermined time, an electric current that drives the DC motor.

* * * * *